May 31, 1960 E. ESTREMS ET AL 2,939,120

CONTROLS FOR MEMORY DEVICES

Filed Dec. 23, 1957 16 Sheets-Sheet 1

INVENTORS
EUGENI ESTREMS
MAURICE PAPO
BY John P. Dority
ATTORNEY

May 31, 1960 E. ESTREMS ET AL 2,939,120

CONTROLS FOR MEMORY DEVICES

Filed Dec. 23, 1957 16 Sheets-Sheet 2

May 31, 1960 E. ESTREMS ET AL 2,939,120

CONTROLS FOR MEMORY DEVICES

Filed Dec. 23, 1957 16 Sheets-Sheet 4

May 31, 1960 E. ESTREMS ET AL 2,939,120

CONTROLS FOR MEMORY DEVICES

Filed Dec. 23, 1957 16 Sheets-Sheet 7

May 31, 1960 E. ESTREMS ET AL 2,939,120

CONTROLS FOR MEMORY DEVICES

Filed Dec. 23, 1957 16 Sheets-Sheet 8

May 31, 1960 E. ESTREMS ET AL 2,939,120

CONTROLS FOR MEMORY DEVICES

Filed Dec. 23, 1957 16 Sheets-Sheet 9

United States Patent Office 2,939,120
Patented May 31, 1960

2,939,120

CONTROLS FOR MEMORY DEVICES

Eugeni Estrems, Saint Mande, and Maurice Papo, Paris, France, assignors to International Business Machines Corporation, New York, N.Y., a corporation of New York Filed Dec. 23, 1957, Ser. No. 704,780

16 Claims. (Cl. 340—174)

This invention relates to improvements in computing machines and particularly to improvements in controls for memory elements.

One embodiment of the present invention utilizes two scanning chains or rings associated with an array of memory elements such that data read from one field of the array may be transferred into another field of the same memory array or another memory array character by character.

An apparatus operating in this manner with the ability to split a memory array into an arbitrary number of fields is shown and described in the copending application to E. Estrems, Serial No. 710,312 filed January 21, 1958.

The apparatus of the above-mentioned copending application is adapted to circuits of some simplicity, but at the price of relatively important time losses and substantially intricate connections. For example, it is necessary to search for the memory field to which access is desired. That can be done through a systematic scanning of all the locations in the memory and a search for field beginning coincidence, but it is quite obvious that time used during this search, extends the calculation time correspondingly. It is also necessary to determine for each memory field, the location corresponding to the lowest ordered position and that corresponding to the highest ordered position of a field, which requires a corresponding number of connections.

Such a mode of definition of memory fields is acceptable if constant length fields are to be processed. In such a case, it is necessary to define for each field its beginning and its end.

In many applications, such as those involving punched cards, the lengths and positions of the several fields are fixed. In such cases the memory array may be split in several fields, such that all the fields are contiguous to each other, and according to the present invention, any connection defining the beginning of a field may be used for defining the end of the preceding field and conversely any connection defining the end of a field may be used for defining the beginning of the next field.

If each location in a storage array is arbitrarily assigned a number to form a continuous sequence from 1 to N, a field is constituted by a series of numbers of decreasing order and that to the locations of a field there corresponds a series of numbers, decrease-wise for example with respect to the numbering order. Thus, a connection corresponding to any location of order P in the memory (and subsequently defining this location without ambiguity), may serve the purpose of defining order locations $P+1$ or $P-1$. If this connection corresponds to the highest weight location in a field, and if scanning is performed in the order inverse to numbering, this connection indicates that the end of this field has been reached, and that scanning must be interrupted. Reciprocally, if this connection corresponds to the lowest weight location in a field, it may serve the purpose of starting an operation so as to set scanning in action. In that case, the next connection met indicates that the end of the field has been reached, and again scanning must be interrupted.

A primary object of this invention is to provide an improved process of splitting a memory in an arbitrary number of fields. In the present embodiment of the invention these fields are defined by a single connection, this connnection corresponding to a selection either of the lowest order or the highest order of said field, circuits being so arranged that this sole connection may serve, at the same time, for defining the beginning of a field and the end of the immediate contiguous field.

Another object of the present invention is to provide improved means for controlling scanning chains whereby a direct start of said chains in a selectively specified location may be had. This location may correspond to the lowest order in the split fields controlled by said chains.

Another object of this invention is to provide an improved circuit arrangement, and a new mode of controlling emitting and receiving memories such that scanning and read-out operations in the emitting memory, and scanning and write operations in the receiving memory are limited to memory fields which have been selected, and particularly are interrupted by the connection used for defining the contiguous split field.

Another object of this invention is to provide improved control and selection for the split fields. Contiguous units capable of receiving control and definition connections of the split fields may be used. These contiguous units are connected to each other through circuits so arranged that any connection may at the same time serve the purpose of the definition connection for the beginning of a split field A and for the end of another split field B, if for example, it is located immediately on the left of the connection which defines field B and if besides, it corresponds to a memory location of an order number lower than the order number of the memory location where field B begins.

Another object of this invention is to provide improved control circuits for a program unit.

Another object is to provide an improved program unit adapted to set a scanning chain in the lowest order location in the memory field controlled for read-out or write.

Another object is to provide an improved program unit adapted to control read-out or write of information data and operations performed on these data.

Another object of this invention is to provide an improved program unit adapted to search, on occasion, for a sign if said sign is not in a location specially provided for the purpose.

Another object is to provide an improved program unit adapted to replace the obtained number by its complement if the performed operation provides the complement for the desired result.

Another object is to provide a program unit with improved advancing controls responsive to the completion of an operation.

Another object is to provide improved program branching in response to calculated data.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a general block diagram of a data processing machine embodying the present invention.

Figs. 2*a* through 2*k* taken together are a more detailed block diagram of the machine of Fig. 1.

Figure 1:
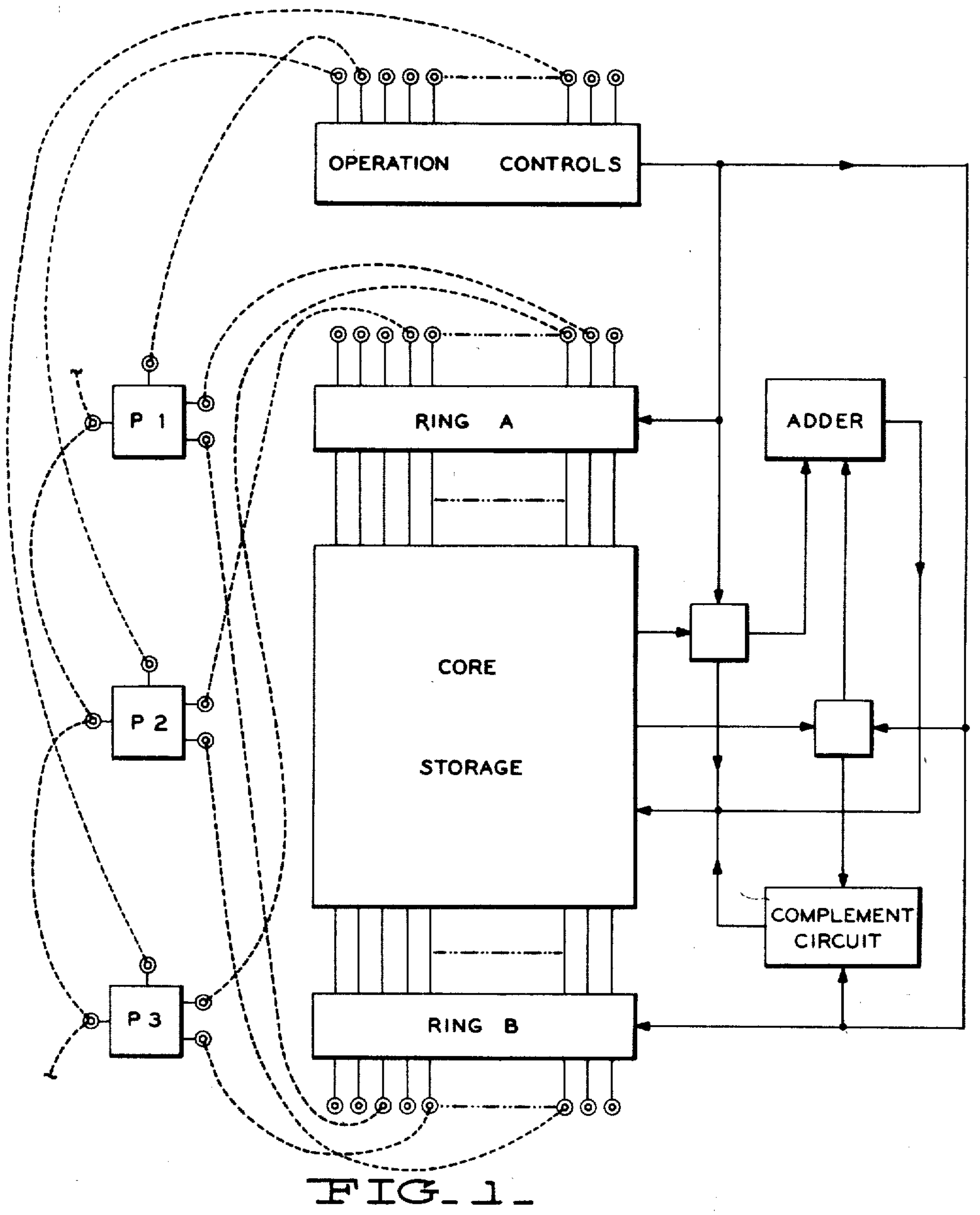

Referring first to Fig. 1, there is shown a general block diagram of a data processing machine according to the present invention. Only that part of the machine concerned with the present invention is shown. Only program steps P1, P2 and P3 are indicated although a machine would normally include many more. A program step such as P2 may be considered one stage of a ring. The several stages of a ring so formed are connected together with pluggable connectors in order that the steps may be energized in any sequence desired. A core storage array is shown addressed by rings A and B. Rings A and B are under control of the program steps and independently addressed the core storage array. For example, program step P2 has a plugged connection to ring A. The plugged connection, a single wire to ring A, sets ring A in the corresponding position to thus address core storage. This connection also serves the function of stopping the advance of ring A when ring A advances to this position as a result of having been started by program step P3, for example. The data addressed in this manner by rings A and B are read out from storage, that addressed by ring A being interlaced with that addressed by ring B, to an adder, to a complementing circuit or back into storage. Data addressed by ring A may be transferred to storage positions addressed by ring B or data may be addressed by both rings and fed through the complementing circuit and back to the original location. These and other data flows and controls are described in detail later with reference to Figs. 2*a* through 2*k*.

Figure 8:
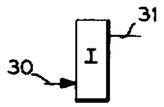
Figure 9:
Figure 9A:
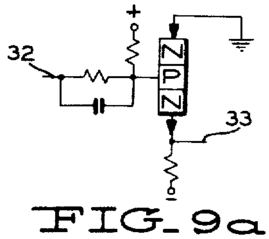

Fig. 9*a* is the symbolic diagram showing of a power circuit as shown schematically in Fig. 9. The purpose of this circuit is to amplify in power the signal appearing on line 32 and deliver it over line 33. The use of this circuit is to allow a simultaneous feeding of several circuits or the feeding of a common output with pulses from several different sources. As a general rule, the circuit in Fig. 9 is not shown. It is considered as being incorporated in some of the circuits in Figs. 5, 6, 8, 10, 11 and 12.

Figure 5:
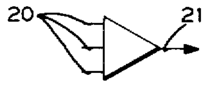
Figs. 5 through 12 show different basic circuits and the symbolical form in which these circuits are shown in Figs. 2*a* through 2*k*.
Figure 5A:
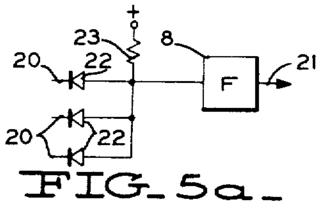

Fig. 5*a* shows in schematic form a coincidence circuit. Input lines 20 receive a voltage normally negative which, in certain conditions may become positive. In the first case, output line 21 receives a negative voltage due to the fact that diodes 22 enable the current to flow, and that a relatively significant voltage drop occurs across resistor 23. This is true even when one only of wires 20 is negative. On the other hand, if all wires 20 are traversed simultaneously by a positive voltage, no current flows through diodes 22 so that across resistor 23 there is only the leak current flowing through line 21. The corresponding voltage drop being relatively low, potential in line 21 takes a positive value. This positive value of potential characterizes the existence of a coincidence between positive input pulses. The latter may be in any number (2, 3, etc. according to the requirement).

The circuit of Fig. 5*a* is represented symbolically as shown in Fig. 5. According to the use, the output is taken directly or through a circuit similar to that shown in Fig. 9.

Figure 6:
Figure 6A:
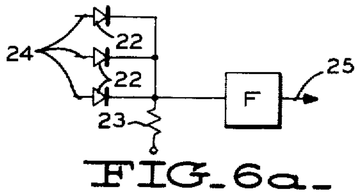

Fig. 6 shows the symbolic form of the OR circuit shown schematically in Fig. 6*a*. Line 25 has a voltage normally negative which becomes positive when one of input lines 24 is positive. The circuit in Fig. 6*a* may be recognized in Figs. 2*a* through 2*k* by its configuration, and is thus not generally referenced. According to the use, the output may be taken directly or through a circuit similar to that shown in Fig. 9.

Figure 7:
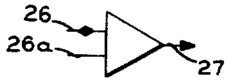
Figure 7A:
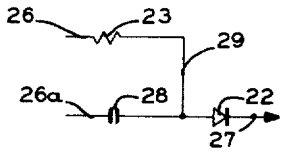
Figure 11:
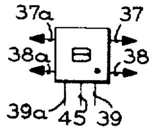

Fig. 7 is the symbolic form in which the circuit of Fig. 7*a* is shown. The latter is a coincidence circuit meant for transferring short duration positive pulses required for the control of triggers such as shown in Fig. 11. Inputs 26 and **26*a*** (Fig. 7*a*) normally are negative and positive respectively and are adapted for receiving positive pulses and negative pulses, respectively. As long as input 26 is negative, pulses directed into input **26*a* remain of no effect due to line 29 which then has a negative potential and to diode 22 which blocks pulse transferring. On the other hand, when input 26 has a positive voltage, potential in line 29 also takes a positive value, thus permitting the transmission of all the positive pulses from input 26*a*. That is the case every time the potential in line 26*a* comes back to a positive value from a negative value. Capacitor 28 then generates a short duration positive pulse which causes potential in line 29 to increase momentarily. Circuits are so arranged that diode 22** allows the current to pass.

Figure 8A:
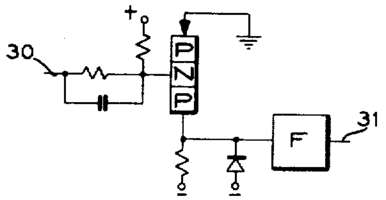

Fig. 8 is the symbolic form in which the schematic circuit of Fig. 8*a* is shown. The latter is an inverter. Output 31 is positive every time the input is negative and conversely. A circuit similar to that shown in Fig. 9 may be included in the output.

Figure 10:
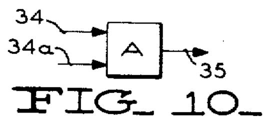
Figure 10B:
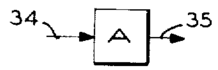

Fig. 10 is a symbolic showing of one of the amplification circuits used in conjunction with magnetic core memories. E.M.F., induced during magnetization reversal is applied between inputs 34 and **34*a*. A positive pulse then is available at output 35**. The circuit is shown in the symbolic form in Figs. 2*a* through 2*k*. In Fig. 10*b*, only one input is shown, the other is assumed to be returned to a fixed potential. A circuit similar to that shown in Fig. 9 may be inserted in the output.

Fig. 11 is a schematic showing of a transistorized trigger. Such a circuit has particularly been described in applicant's copending application Serial No. 643,369 filed March 1, 1957. A first stable state of this circuit corresponds to a conduction achieved for example through transistor 36. In this case, output 37 takes a negative voltage while output **37*a* has a positive voltage. The state of the trigger may be switched by a positive pulse applied to input 38. A positive pulse applied to input 38*a*** is of no effect. The switching pulse may be from a circuit of the type represented in Figs. 7 and 7*a*.

The state of the trigger (Fig. 11*a*) may be switched by the application of a positive voltage to line 39. This voltage affects the circuit formed by capacitor 40, resistor 41 and diode 42, which circuit is an assembly formed by the component elements of Fig. 7*a*. It should be noted particularly that one of the ends of resistor 41 is integral with output **37*a*, which now is assumed to have a positive voltage. A positive voltage directed into line 39*a* is of no effect due to the end of resistor 41*a* which is connected to line 37 now assumed to have a negative voltage. Generally speaking, it is possible to direct several pulses into lines 38 or 38*a* or provide the application to lines 39 and 39*a*** of positive voltages from several different origins.

A second stable state of the trigger corresponds to a conduction through transistor **36*a*. In that case output 37*a* takes a negative voltage while output 37 has a positive voltage. The state of the trigger may be switched either by a positive pulse directed into line 38*a*, or a positive voltage directed into line 39*a*. Obviously, this switching is accompanied by the reversal of respective potentials in lines 37 and 37*a***.

Figure 11A:
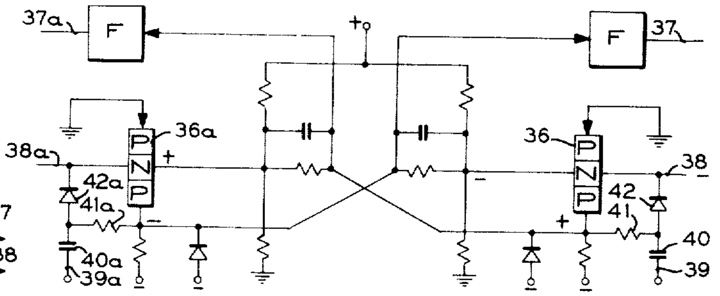

The trigger in Fig. 11*a* will be represented in Figs. 2*a* through 2*k* in the symbolic form of Fig. 11; reference letters however being possibly B, D, M, P, R, U or W. Identification of the lines will be apparent according to their origin and their connection to the right part or the left part of the square or to the upper or lower part. It is possible also to have a control 45 connected to the middle of the lower part. Such a control is equivalent to a positive pulse simultaneously applied to inputs 38 and 38*a*. It has been noted already that only the pulses applied to the conductive side are effective. The time constants of the circuits are so calculated that only one switching then occurs. A spot inside the square on the right or the left side indicates the side which is conductive normally. It has been seen, in that case, that the corresponding output has a negative voltage.

Figure 12A:
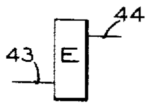
Figure 12:
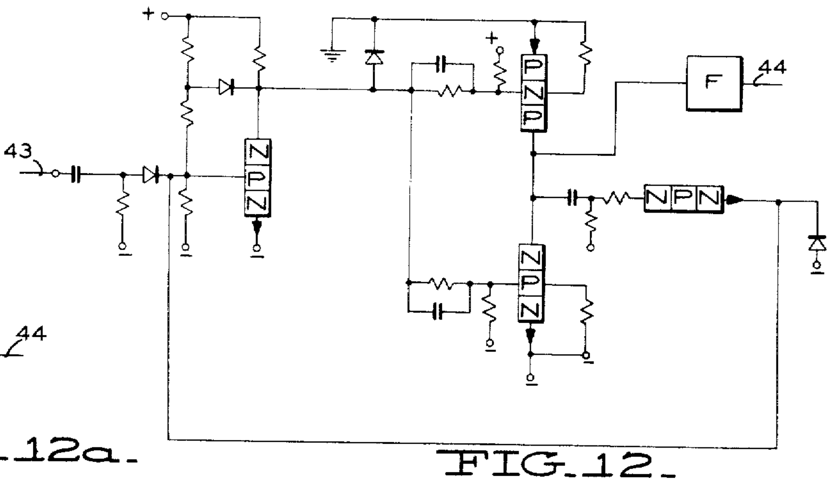
Figure 14:
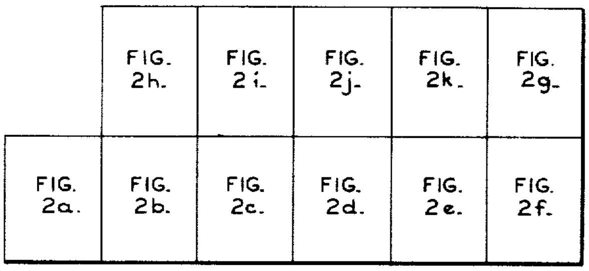
Fig. 14 shows how Figs. 2*a* through 2*k* should be placed together.

Fig. 12 shows schematically, a pulse emitter. A positive voltage directed into line 43 causes at output 44 the emission of a relatively short duration positive pulse. A circuit similar to that shown in Fig. 9 may be inserted in this output. The circuit of Fig. 12 is shown symbolically at Fig. 12*a* with reference letter E and is used essentially for delivering base pulses which will control the assembly of the circuits as explained hereafter.

Figure 2A:
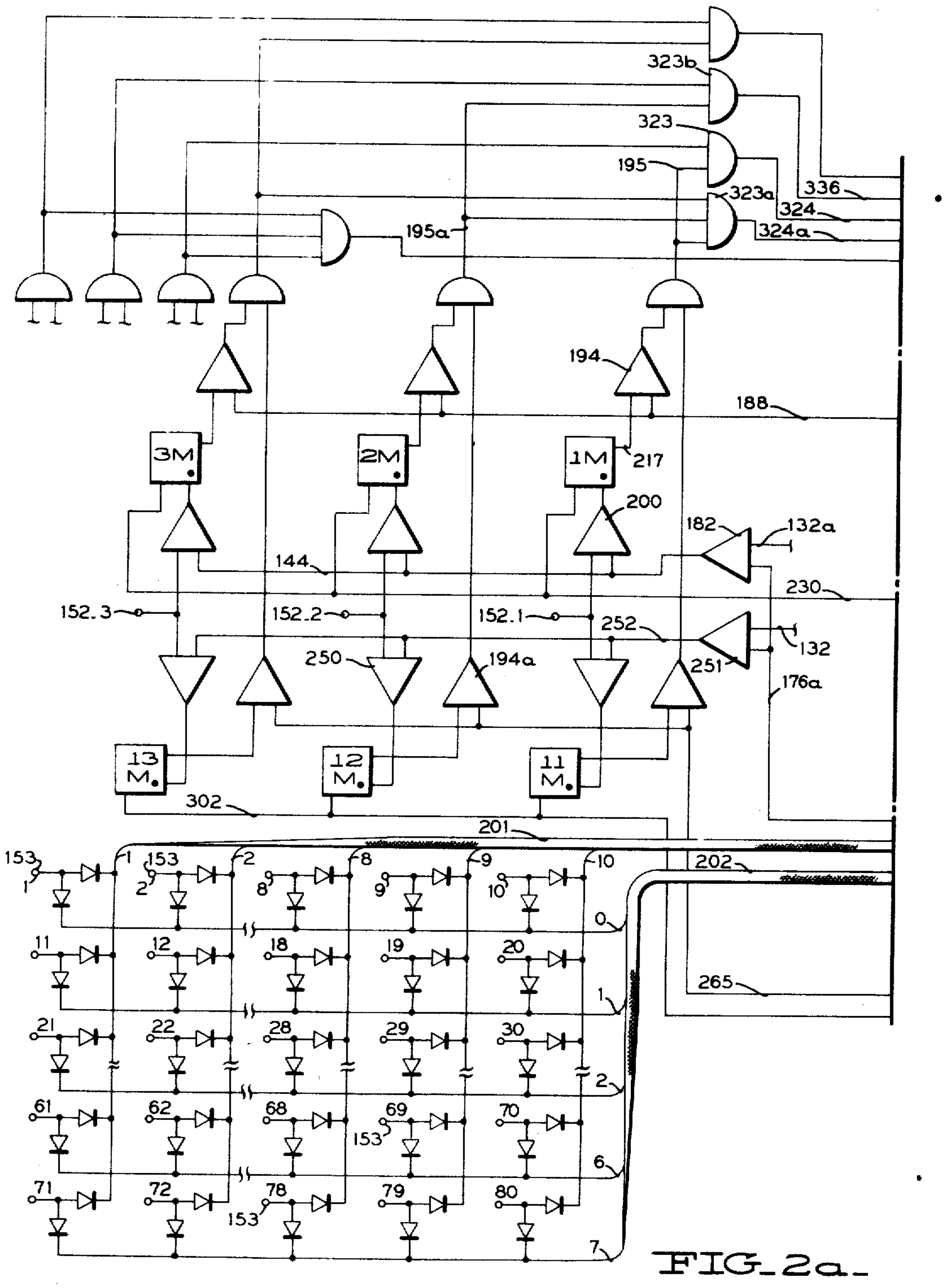
Figure 2B:
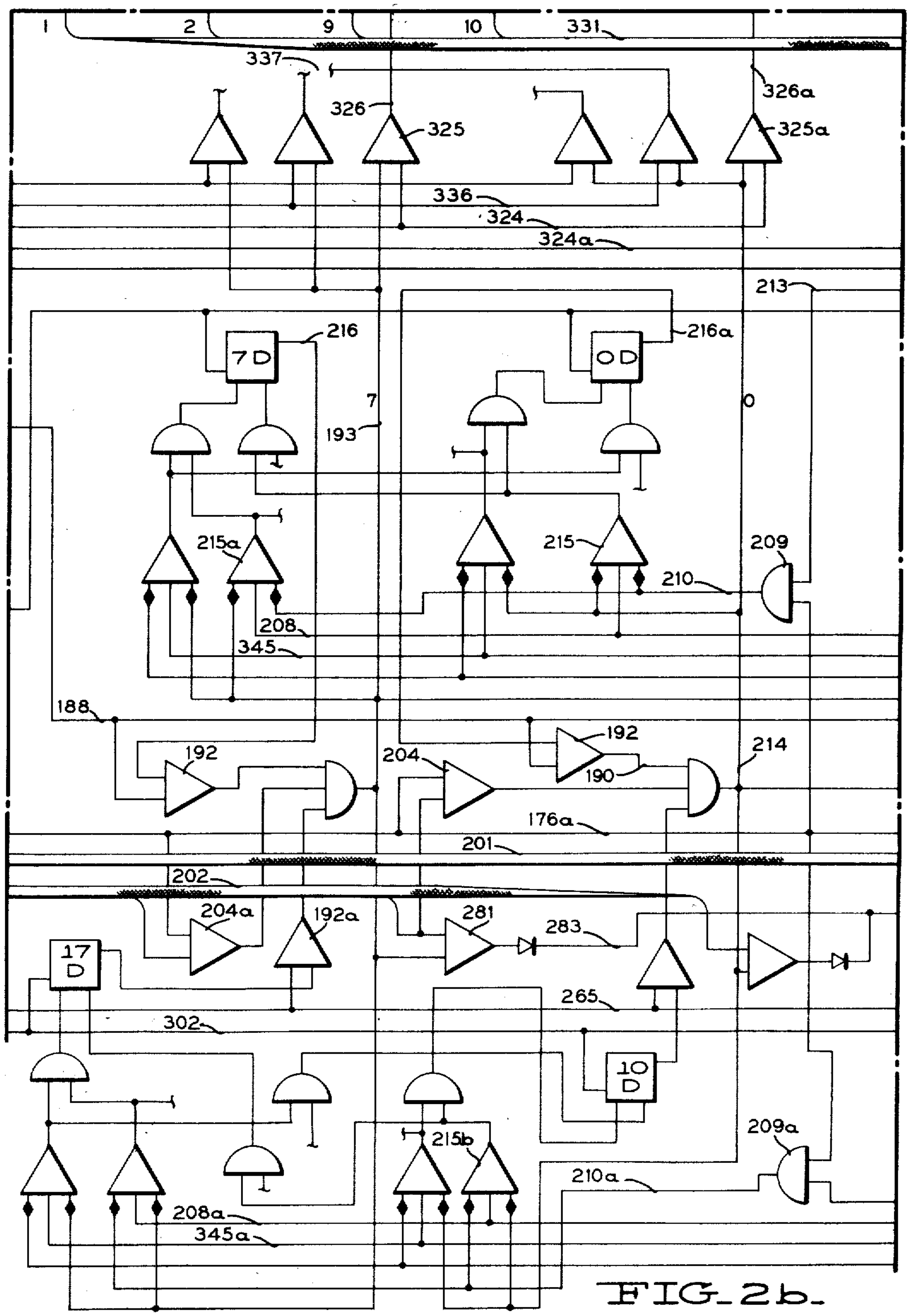
Figure 2C:
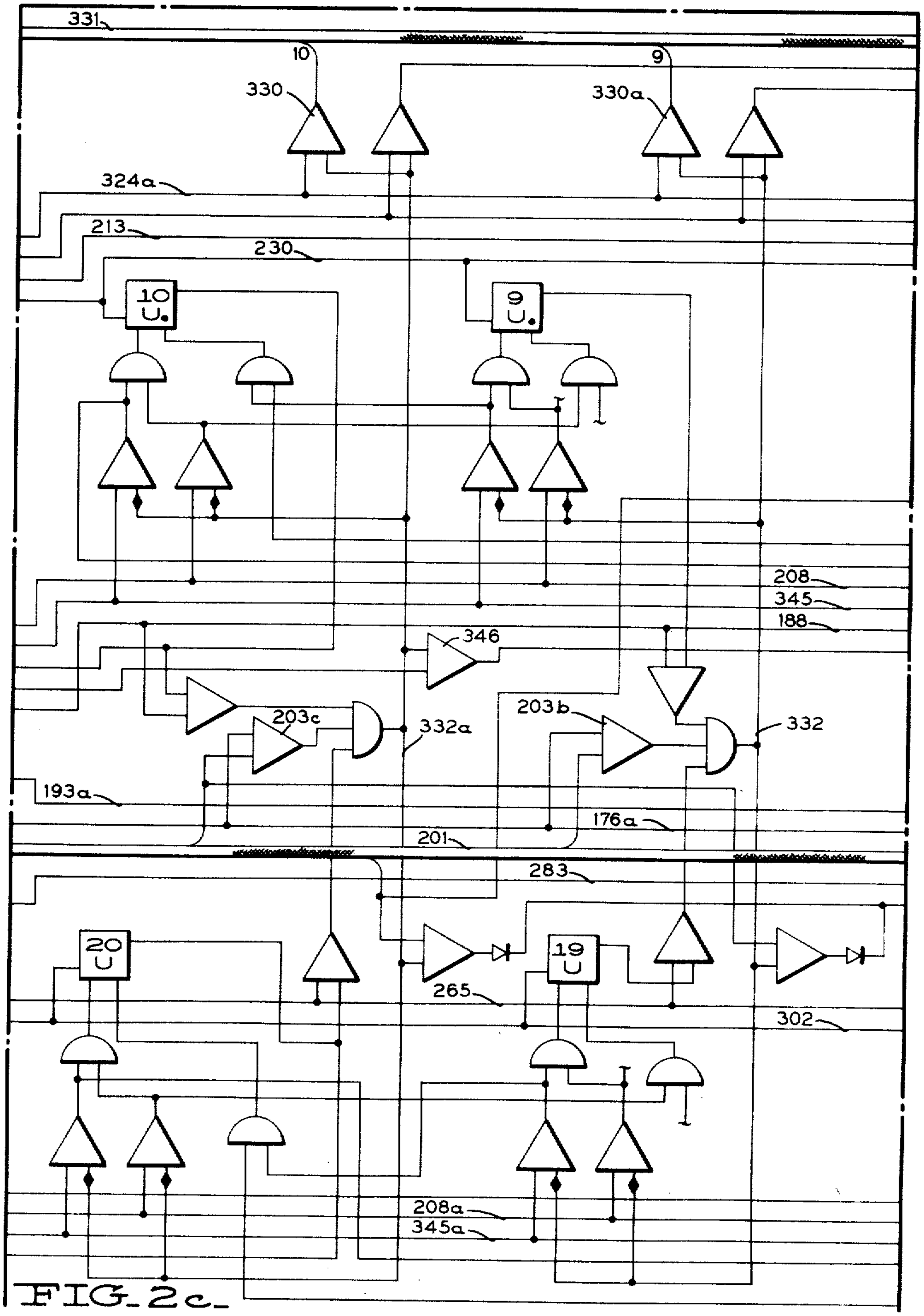
Figure 2D:
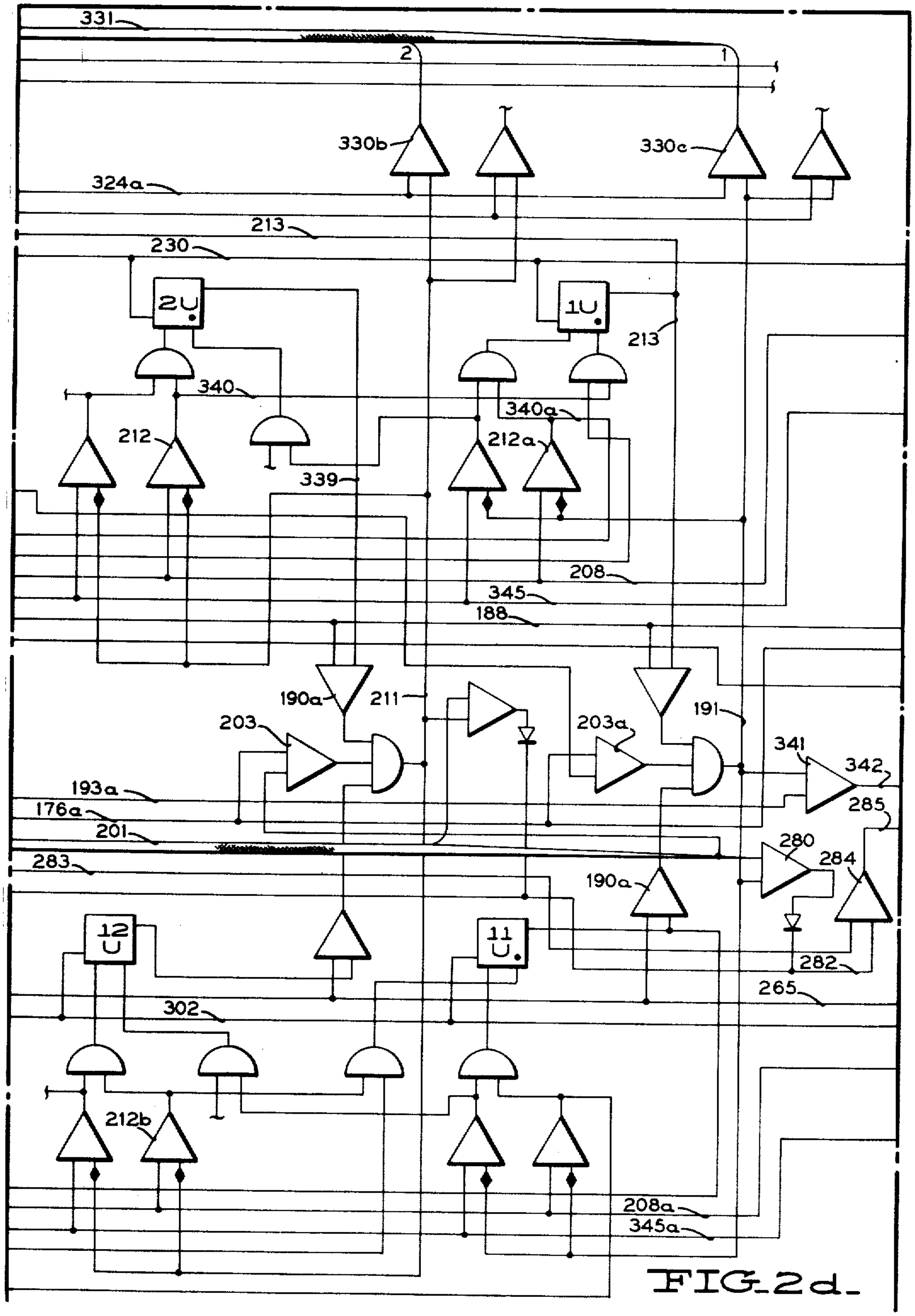
Figure 2E:
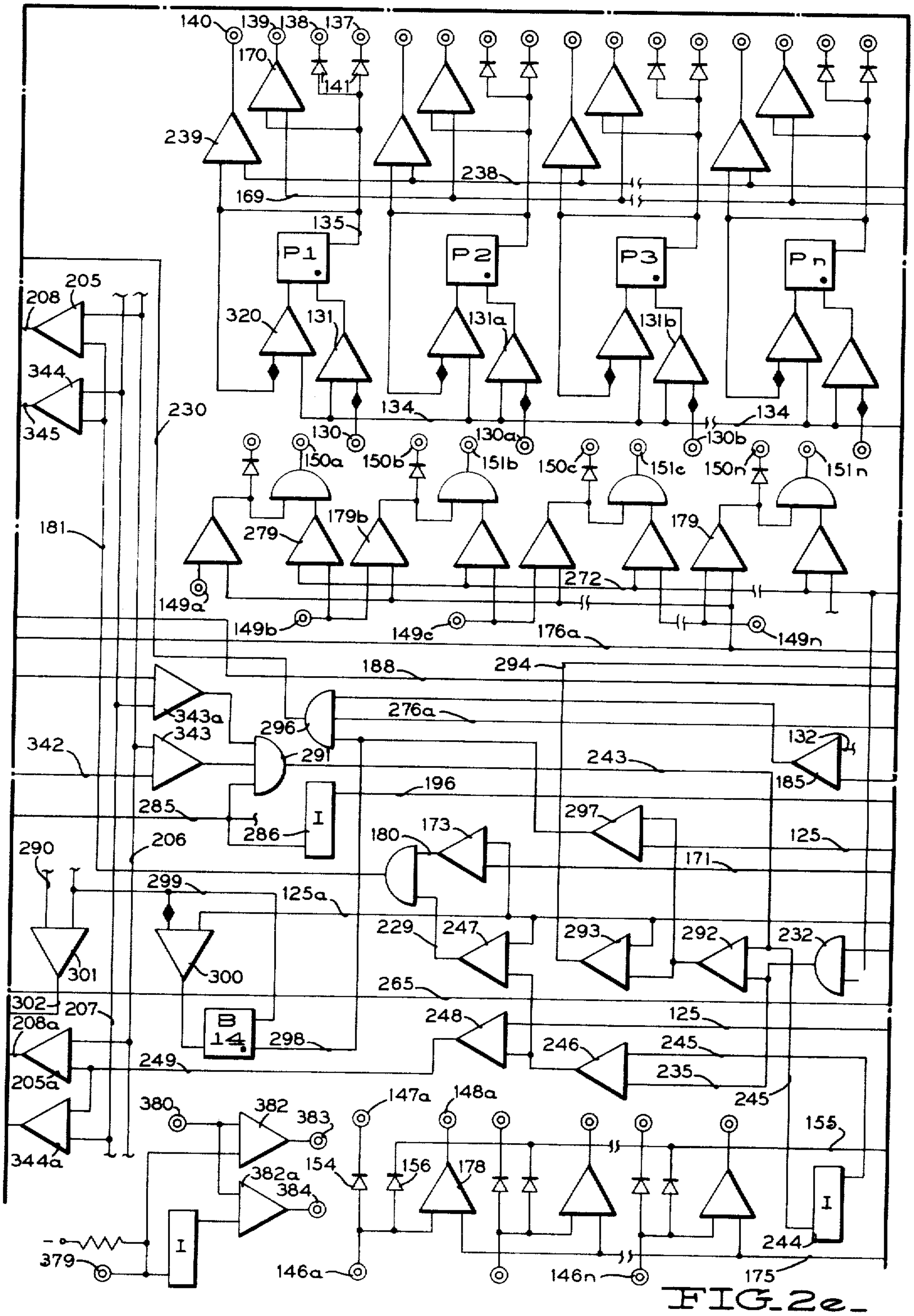
Figure 2F:
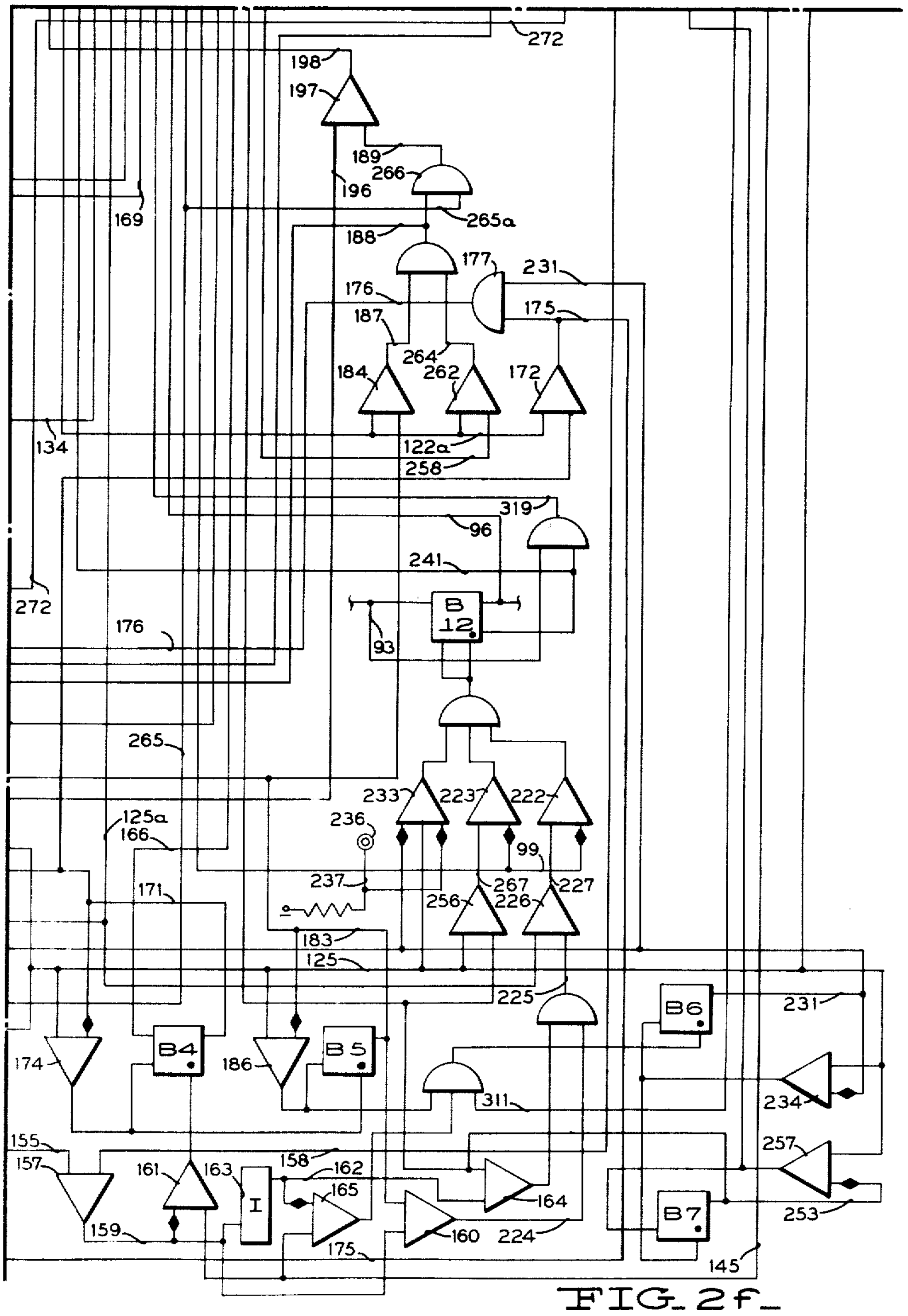
Figure 2J:
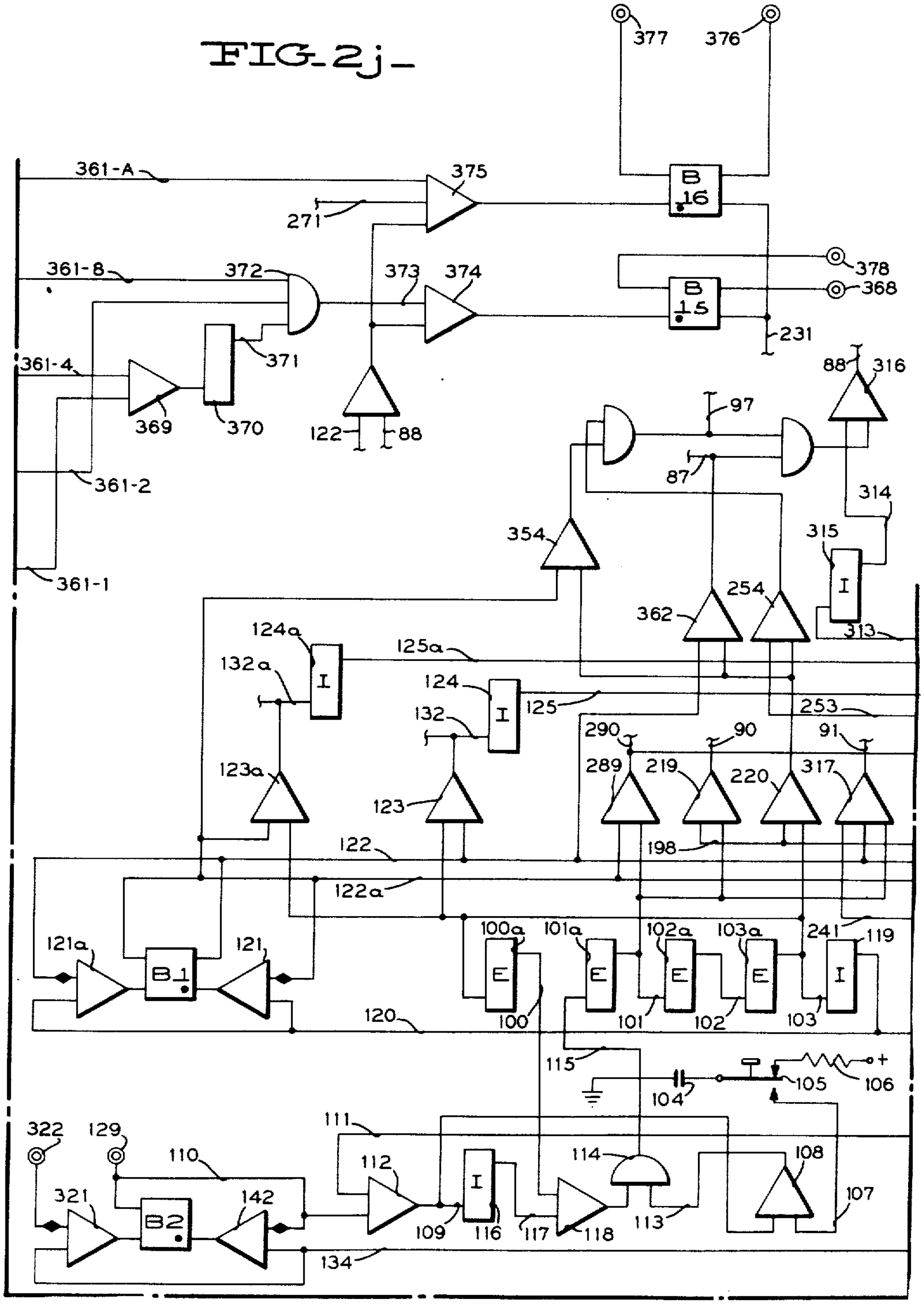
Figure 2K:
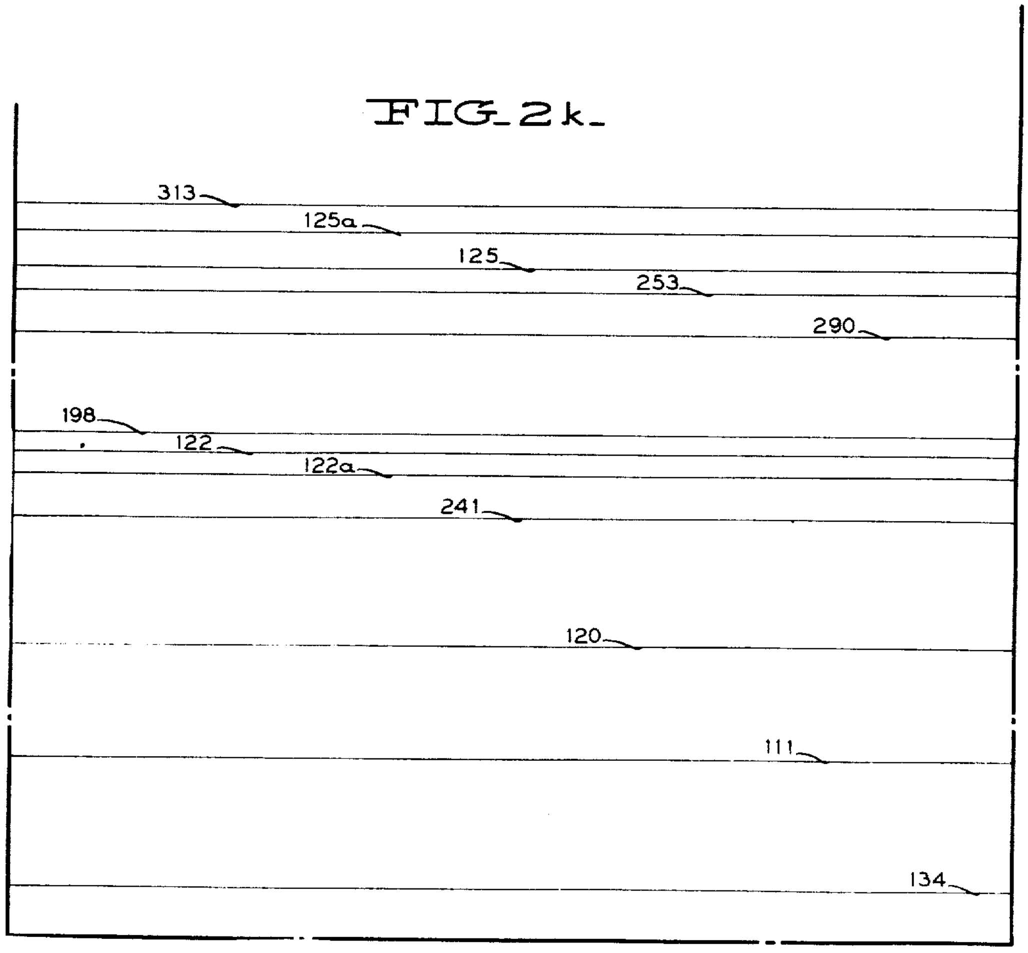
Figure 3:
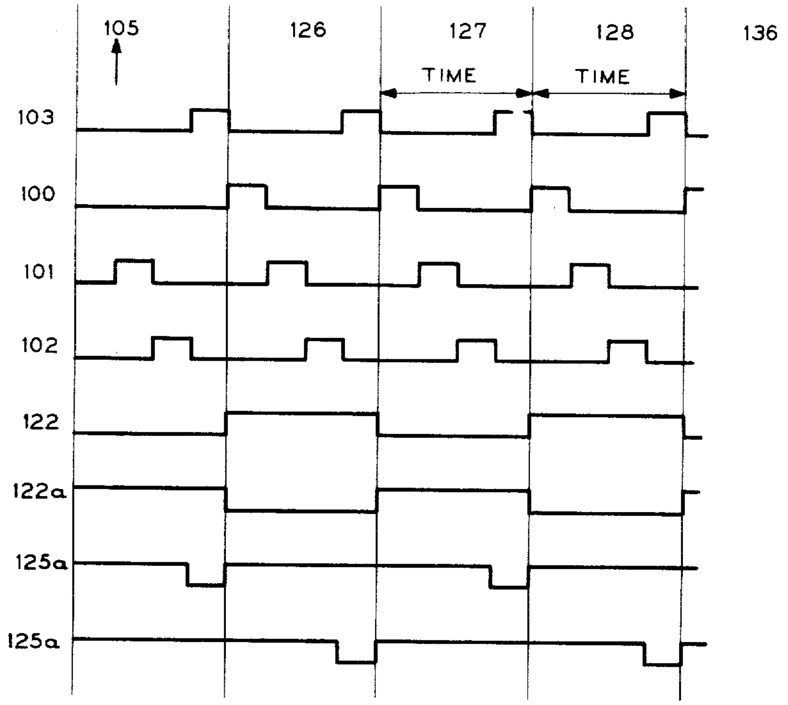
Fig. 3 shows the sequence order in time of certain pulses with the numerals at the left indicating also the lines of Figs. 2*a* through 2*k* on which the pulses appear.

*Pulse generator.*—The pulse generator is made up of four emitters 100*a*, 101*a*, 102*a*, 103*a* (Fig. 2*j*) working as a closed circuit. Further details of these emitters are shown in Fig. 12. They are controlled by positive pulses applied to their input terminal 43 and delivering in this case a very short duration positive pulse at their terminal 44. These pulses are fed respectively over lines 100, 101, 102, 103 (Fig. 2*j*) and are lagging in time as indicated in Fig. 3.

This pulse generator may be switched on or off in the conditions to be analyzed now. Capacitor 104 is normally charged positively through contact 105 and resistor 106. A manual or automatic action on contact 105 directs a positive voltage into line 107 and AND circuit 108. Lines 109, 110, 111 also have a positive voltage. Both the latter come from the non-conducting sides of triggers B2 and B3 (Fig. 2*g*) respectively. Subsequently, output 109 (Fig. 2*j*) of AND circuit 112 receives a positive voltage and likewise output 113 from AND circuit 108. This voltage is applied to OR circuit 114, to line 115, and to emitter 101*a*. The latter thus emits its first pulse, which causes the successive emission of pulses from elements 102*a*, 103*a* and 100*a*.

The first pulse transmitted through line 103 causes the switching of triggers B2 (Fig. 2*j*) and B3 (Fig. 2*g*) as will be seen later. AND circuit 112 (Fig. 2*j*) is thus blocked. Voltage in output line 109 subsequently is driven to a negative value, while voltage in line 117 from inverter 116 is driven to a positive value, which prepares the transmission of pulses through AND circuit 118.

When emitter 100*a* is set in action, the pulse on line 100 traverses AND circuit 118 and again controls emitter 101*a*, this result being obtained through OR circuit 114. Subsequently, emitter 101*a* delivers a second pulse which in turn starts emitters 102*a*, 103*a* and 101*a*, then again 101*a*, etc.

To sum up, the chain formed by emitters 101*a*, 102*a*, 103*a* and 100*a* delivers a series of successive pulses, which series is indefinitely renewed as long as the voltages applied to AND circuit 112 remained unchanged.

Line 103 controls inverter 119 which feeds line 120 and AND circuits 121 and 121*a*. Trigger B1 being reset as mentioned, output line 122*a* has a positive voltage, which thus favors AND circuit 121. The latter, which has been described in detail in Fig. 7, thus transmits a first pulse which causes trigger B1 to be switched. It should be noted that line 120 initially has a positive voltage. Line 120 is driven to a negative voltage when emitter 103*a* is started and it has been seen that AND circuit in Fig. 7 then transmits no pulses. When pulse on line 103 stops, that is when line 103 comes back to a negative pulse, line 120 comes to a positive pulse and it is only at that time, as that has been seen, that AND circuit in Fig. 7 may transmit a pulse. The first switching of trigger B1 therefore coincides with the end of the first pulse on 103, that is with vertical line 126 in Fig. 3.

The state of trigger B1 (Fig. 2*j*) having been switched, line 122*a* comes back to a negative voltage, blocking AND circuit 121. Line 122, besides, comes to a positive voltage, favoring AND circuit 121*a*. A switching pulse thus may be applied to the left side of trigger B1 at the end of the next pulse on line 103. The time of this switching corresponds in Fig. 3 to vertical line 127.

Line 122*a* thus comes back to a positive voltage favoring again coincidence circuit 121 and preparing a new switching of the state of trigger B1, etc.

Generally speaking, the state of trigger B1 is switched every time line 103 comes back to a negative voltage. Lines 122 and 122*a* are traversed by alternate voltages alternately positive and negative as appears from Fig. 3.

*Advance pulses.*—A tapping from line 103 leads to AND circuits 123 and 123*a*, which again are fed respectively by lines 122 and 122*a*. Output lines 132 and 132*a* therefore, always have a negative voltage, except when positive pulses are applied simultaneously to two inputs of AND circuits 123 and 123*a*. These lines lead to inverters 124 and 124*a*, which respectively feed lines 125 and 125*a*. These lines then always have a positive voltage, except when positive voltages are directed simultaneously into AND circuits 123 and 123*a*. The purpose of lines 125 or 125*a* is to cause the switching of the various triggers as is to be seen later. Circuits controlled from these lines are so arranged as a general rule, that switching occurs when lines 125 or 125*a* come back to a positive voltage, and this switching subsequently coincides with the end of a pulse on line 103.

*Registers and scanning chains.*—In the embodiment of the invention which is being described, it was assumed that the registers comprised magnetic cores. It is known that, under certain conditions, certain magnetic substances possess two remnant states of saturation and that by distinguishing these states from one another it is possible to determine the presence or absence of an information bit. It is well understood that the use of memories of that type is not exclusive with respect to the invention. The selected record code is a mixed code associating binary elements 1, 2, 4, 8 with elements A, B and C. Such a code require seven magnetic cores for each position. It may be successfully used for numerical recording, alphabetic recording as well as the recording of certain special characters. Element C could be as desired, a parity or a no-parity controlling code. It will systematically be used in certain cases so that the number of elements serving to record a digit or a letter should always be even. Thus digit one will be recorded for example 1–C; digit 6 will be recorded 2–4 without element C, whereas digit 7 will be recorded 1–2–4–C. It will then be understood that the selected record code is not exclusive and is but illustrative.

The cores for a same position and the circuits connected therewith will conventionally be indexed with digits or letters 1–2–4–8–A–B–C, according to the element of the corresponding code. It is obvious that here, letters A and B have a completely different meaning from the meaning they had in the expressions Time A, Time B, scanning chain A, scanning chain B. There will result no confusion since none of these letters will ever be used alone.

With regards to the sign for some factors, it will be recorded as an element A if it is a "minus" sign. The absence of such an element will automatically mean a "plus" sign. Practically the sign will be recorded in each memory field in the less significant place. In some cases the sign may be stored in any position, when, for instance, a factor is directly recorded from a punched card or when the perforation representing the sign of this factor has been performed in any column of said card.

In each memory, there may be any number of locations, said numbering ranging from a few units to several times 10. However, it is to be noted that the invention has been specially planned to be conveniently used with great capacity memories.

In the same way there may be any number of memories. As may be well understood and to avoid reproducing indefinitely identical circuits, five memories only have been represented in the enclosed drawings (Fig. 2h). Each register has been symbolically represented by seven superposed squares seen in perspective, each square corresponding to one element of the used code.

As an illustrative example, let it be assumed that each memory comprises 80 locations for recording 80 digits, letters or special characters. It will be remarked that each memory is able to register the whole of the information recorded in a punch card with 80 columns.

In each memory, the locations are grouped according to a coordinate system such as is represented in Fig. 12. Locations 1 to 10 of memory M1 for instance are defined by coordinates $y=1$, $x=1, 2, \ldots 8, 9, 10$. In the same way, locations 11 to 20 are defined by coordinates $y=2$, $x=1, 2, 3 \ldots 8, 9, 10$. It is well understood that this defining method is but illustrative and that any coordinate system could be used

| | |
|---|---|
| $x=1$ to 9 | $y=1$ to 9 |
| $x=1$ to 12 | $y=1$ to 7 |
| $x=1$ to 16 | $y=1$ to 5 |
| $x=1$ to 80 | $y=1$ |

with possibly a few blank locations if the coordinate system defines a total memory location number which is superior to the actual location number.

The various locations of one memory are conventionally numbered in an increasing order according to a continuous numbering system going from one to 80. This numbering system is based on the custom of numbering the columns of a card according to a continuous system of numbers increasing from left to right. It is to be noted that this numbering method is exactly inverse to the method generally adopted for indicating the various adjacent digits of a number. Thus number 248 for example, will be recorded:

2 in location 14
4 in location 15
8 in location 16.

When it is desired to sense and read out that number (for instance to add it to another number) it is to be done character by character, beginning by the less significant weight digits. Consequently, there will be effected in turn the sensing and read out of the digit stored in location 16, then of the digit stored in location 15, etc. In other words, the various locations of a same memory will be scanned in the inverse order to their numbering.

So as to allow the free access to any location in any memory, scanning chains are associated with these memories the number of scanning chains corresponding to the number of addresses of the adopted operation type. A one-address operation would consist in effecting the elementary adding operation $a+b=c$, with the help of three different program stages, the first one controlling the transfer of factor $a$ to an adding organ, the second one controlling the transfer of factor $b$, whereas the third one controls the registering of the adding operation result, this being indispensable to clear the adding organ and to permit its use in a second series of operations. Such an operating method requires but one scanning chain since each program stage controls but one operation.

A three-address operation would permit to effect the elementary adding operation $a+b=c$ in one program stage. It requires three scanning chains. For the read-out of factors $a$ and $b$ and the registering of the addition result are to be performed simultaneously.

In many cases, it is not advantageous to process in that manner and in particular when one factor is an accumulating element and when this factor becomes completely useless as soon as its function is performed. In such a case the factor may be replaced by the result of the operation. There results the double address operating type and to basic type of operation: $a+b=b'$. Factor $b$ is an intermediate computing result which is determined but to value $b'$ and is deleted as soon as its function is performed that is precisely as soon as $b'$ is known. In such a case, two scanning chains will suffice, and it will again be noted that these chains have different functions: one chain controls the read-out and regeneration of factor $a$, and the second the read-out and deletion of factor $b$ and its replacement by the result of operation $b'$.

This double address operating type has been adopted in the embodiment being described. The scanning chains will be designated generally: chain A or chain B according to whether they control the read-out and regeneration of factor $a$ or the read-out of factor $b$ and its replacement by the result of operation $b'$.

Figure 13:
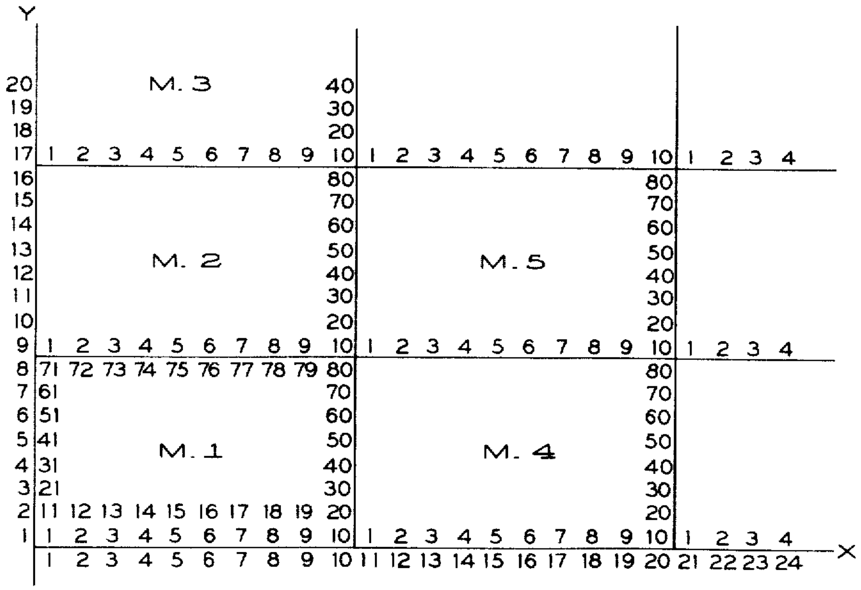
Fig. 13 shows how the various memories may be juxtaposed.

The scanning chains are disposed in a fashion similar to that whereby the various locations of a memory have been distributed into groups of rows and columns (refer to Fig. 13). For example, chain A is subdivided into a unit chain for scanning the register according to abscissa $x$ and a tens chain for scanning according to ordinate $y$.

The unit chain is composed of triggers 1U to 10U (Figs. 2c and 2d) wherein only the first two and the last two have been represented. The locations 1 to 10 and the positions that may be gathered therefrom by adding integer multiples of 10 are associated with these triggers. The various memory locations being scanned in the order inverse to their numbering, it will be likewise with regards to the normal advance of the unit chain, as will be seen hereafter.

The tens chain is composed of triggers 0D through 7D (Fig. 2b) wherein only the quoted triggers have been represented. With said triggers are associated respectively the first ten memory locations, then the next ten, and so on. As will be seen the normal tens chain advance is also effected in the order inverse to their numbering, so as to permit first the scanning of the memory locations bearing the numbers 80 to 71, then locations bearing the numbers 70 to 61. Generally the number of the triggers controlling the scanning of a given memory location is immediately determined by parting the digits of this number from each other. Thus location 27 is controlled by triggers 2D and 7U respectively. There is one single exception for the locations having a number which is a multiple of 10, for example, location 30 is controlled respectively by triggers 2D and 10U, not by triggers 3D and 0U.

Also triggers 1M, 2M, 3M . . . (Fig. 2a) for determining the memory according to its number are associated with scanning chain A. For example, if trigger 1M is switched, line 217 is at a positive voltage; and it will be the same for line 195 when AND circuit 194 allows the equalization of the voltages. Line 195 goes through OR circuits 323 and 323a which feed lines 324, 324a respectively. The latter will be positive whenever AND circuit 194 permits a voltage equalization, i.e., whenever line 188 is positive.

Line 324 controls AND circuits 325 (Fig. 2b) and 325a and lines 326 and 326a. Thus these lines may turn positive if one line 193 or 193a is positive that is if one trigger 0D to 7D is switched (the circuits corresponding to triggers 1D to 6D have not been represented). If trigger 7D is switched, for example, line 216 is positive causing line 190 to be at a positive voltage when line 188 is positive. It has been seen that the voltage of lines 195 (Fig. 2a) and of lines 324 and 324a were dependent on the voltage of the same line 188. Lines 326 and 326a (Fig. 2b) may also be seen in Fig.

2*h*. For example, line 326 controls AND circuits 327 and 327*a*, units 328, 328*a* and the line out of group 329 which is also indexed 7 or $y=8$; line 326*a* similarly controlling the line out of same group which is designated also by 0 or $y=1$.

Lead 324*a* (Fig. 2*b*) controls AND circuits 330 (Fig. 2*c*) 330*a*, 330*b* (Fig. 2*d*), 330*c* and lines generally designated by 331. Thus these last named lines may also turn positive if any line 191, 211, 332 (Fig. 2*c*) or 332*a* is positive itself that is if one trigger 1U to 10U is switched. For example line 213 (Fig. 2*d*) is positive if trigger 1U is switched and it will be the same for line 191 when line 188 is positive, and line out of group 331 which is further designated by 1 (see also Fig. 2*h*) which controls AND circuits 333, 333*a*, units 334, 334*a* as well as the line out of group 335 which is referenced $x=1$.

As a conclusion the simultaneous switching of triggers 1M (Fig. 2*a*), 7D (Fig. 2*b*) and 1U (Fig. 2*d*) for example causes the respective energization of the lines out of groups 335 (Fig. 2*h*) and 329 further designated $x=1$ and $y=8$ and consequently the memory location where these lines cross, that is location 71 of memory M1.

In a similar way, it will be shown that the switching of trigger 2M (Fig. 2*a*) results in turning line 195*a* positive under certain conditions (line 188 being positive). Line 195*a* is connected through OR circuit 323*a* to line 324*a* which is the same line as previously mentioned controlling line group 335 (Fig. 2*h*). On the other hand a second connection from line 195*a* reaches OR circuit 323*b* which controls line 336 (see also Fig. 2*h*) line group 337, as well as line group 338 (Fig. 2*h*). The circuits connecting both these groups have not been represented, but are similar to those connecting line groups 326 (Fig. 2*b*) and 329 (Fig. 2*h*). Line groups 335 and 338 cross one another in the memory field corresponding to the 80 locations of memory M2.

It will also be seen that the switching of trigger 3M (Fig. 2*a*) generally controls memory M3 (Fig. 2*h*), connecting circuits being but partially represented. Likewise a trigger 4M (not shown) controls memory M4, etc.

Scanning chain B is disposed in exactly the same way as chain A. It comprises a unit chain composed of triggers 11U to 20U (Figs. 2*d* and 2*c*), a tens chain composed of triggers 10D to 17D (Fig. 2*b*) and triggers 11M, 12M, 13M associated with it (Fig. 2*a*).

It will be noted that all these reference numbers are the same as for chain A, to which there is systematically added 10; for example, a trigger 12M applies a voltage to line 195*a* and that is the line to which a voltage is applied when trigger 2M is switched, the only difference being that this voltage application takes place when line 265 is at a positive voltage. Under the same conditions, trigger 17D (Fig. 2*b*) for example causes a voltage application to line 193 which is also controlled by trigger 7D, whereas trigger 11U (Fig. 2D) applies a voltage to line 191. Generally speaking, chain B controls memories M1, M2, M3 . . . (Fig. 2*h*) just as does chain A with the only difference that this control now coincides with a positive voltage in line 265.

*General operation principles.*—Typical operations performed by the present machine include transfer operations and arithmetical operations performed on values contained in memories. Assume for example the addition of two factors, say *a* and *b*, contained respectively in fields A and B of the memories and, in further assume *b'* as their sum, *b'* having to be substituted for *b* at the end or during the process of the operation.

For simplicity, suppose *a* and *b* are respectively 321 and 8765.

At a first operation time, read out of the first digit of *a* is performed, that is 1.

At a second operation time, read-out of the first digit of *b* is performed, that is 5; then, the addition of 1 and 5 takes place producing the sum 6, then 6 is substituted for 5 in field B. Memory field B at that time contains the number 8766 instead of 8765 as before.

At a third operation time, read-out of the second digit, 2, of *a* is performed; then, at a fourth time of operation, read-out of the second digit, 6, of *b* is performed, then the addition of 2 and 6 takes place to produce the sum 8, and also substitution of 8 for 6. At that time memory field B contains number 8786 instead of 8766 and 8765 as before.

At a fifth time of operation, the read-out of the third digit, 3, of *a* is performed; then at a sixth operation read-out of the third digit, 7, of *b* takes place. The addition of 3 and 7 producing the sum 10 then occurs and 0 is substituted for 7.

Memory field B at that time contains 8086. Carry 1 is kept apart so that it is possible to recycle, should the occasion arise.

At a seventh time of operation, read-out of the fourth digit of *a* is performed, that is 0. If field A is completed, a series of 0's is introduced or substituted until the completion of field B.

At an eighth time of operation, read-out of the fourth digit, 8, of *b*, addition of this digit with the corresponding digit read from field A or substituted, that is $0+8=8$, possible recycling of the carry, that is in the case considered $8+1=9$, and substitution of 9 for 8 takes place.

At that time memory field B contains 9086 which is the result of adding 321 to 8765.

It can be seen from the foregoing that the result of the addition is drawn progressively, digit by digit, and the working method used is characterized essentially by alternation of the read-out of digits from the two fields, the addition of these digits alternately read, and the substitution of the result of the whole operation for the digits read from field B.

These two times of operation are designated time A for a first and time B for the second.

The first time of operation is characterized essentially by a positive voltage of line 122*a* (Fig. 2*j*), and by various pulses controlled by this line. In a wider sense, the name "time A" is given to any time corresponding to a positive voltage of line 122*a*. The end of this time is marked by a return to a positive voltage of lines 120 and 125*a*, by the switching of trigger B1 due to a pulse from AND circuit 121*a*, and still by other switchings to be described further on, when necessary, which have no other purposes than to prepare for the next operations.

The second time of operation is characterized essentially by a positive voltage in line 122 as also various pulses controlled by this line. Likewise, in a wider sense, the name "time B" is given to any time corresponding to a positive voltage in line 122. The end of this time is marked by a return to a positive voltage of lines 120 and 125, by the switching of trigger B1 under action of a pulse from AND circuit 121, and still by another switchings to be examined further on when necessary and the purpose of which is also the preparation of the next operations.

It should be noted that the latter pulses mark the end of the operations relating to digits of a particular order.

*Disposition and advance of the scanning chains.*—The positioning of the scanning chains A and B will presently be described further. It has been explained how the various memory locations correspond to the various combinations of the tens and unit chains. For example, for location 72, triggers 7D (Fig. 2*b*) and 2U (Fig. 2*d*) in chain A are switched, whereas in chain B triggers 17D and 12U are switched. Generally, it is possible to draw up a chart indicating the trigger combinations corresponding to every 80 memory locations. Under these conditions, the positioning of the scanning chains in location *n* of the memories is effected by the combined switching of corresponding triggers. The circuits for connecting the 80 hubs 153 (Fig. 2*a*) and the AND circuits generally designated by 203 and 204 (Figs. 2*d* to 2*b*) fulfill that condition.

With chain A for example in location 72 (switched triggers 7D and 2U), the chain is advanced as will be seen hereafter at the end of each time A whenever the voltage of line 181 (Fig. 2*e*) is turned positive. This movement coincides with a return of line 103 to a negative voltage (Fig. 2*j*). With lines 206 and 207 (Fig. 2*e*) respectively at a positive and a negative voltage, line 208 has the same voltage as line 181. A first switching pulse is produced when trigger B6 is switched (Fig. 2*f*); let it be assumed, as an example, that said pulse caused the switching of triggers 7D and 2U (see above). Lines 216 (Fig. 2*b*) and 339 (Fig. 2*d*) thus have a positive voltage. With line 188 positive (it is to be seen how that is done further on), AND circuit **190*a* passes the positive voltage to line 211 to condition AND circuit 212. AND circuit 212 receives its other input from line 208 to provide a switching pulse on line 340 which is applied to the left side of trigger 2U resetting said trigger to its initial state, and to the right side of trigger 1U, causing this last trigger to be switched. Switched triggers are then 7D and 1U** corresponding to memory location 71.

During the next succeeding time A, lines 213 and 191 are at a positive voltage. Consequently, at the end of that time, an advance pulse is transmitted by AND circuit **212*a* and line 340*a* and applied to the left side of trigger 1U and to the right side of trigger 10U** (Fig. 2*c*). Trigger 1U is thus reset to its initial state, while trigger 10U is switched. At the same time the positive voltage of line 213 (Fig. 2*d*) is applied to OR circuit 209 (Fig. 2*b*) to line 210 and to AND circuit **215*a***.

Lead 188 is always at a positive voltage during time A and since trigger 7D is switched, lines 216 and 193 are at a positive voltage, which is applied to a second input of AND circuit **215*a*. There is no effect therefrom except when trigger 1U** (Fig. 2*d*) is switched the voltage of line 213 is also applied to AND circuit **215*a*** (Fig. 2*b*) as has just been explained. In that case, the latter transmits also an advance pulse, which results in re-setting trigger 7D to its initial state and switching trigger 6D (not shown). Under these conditions at the end of the considered time the switched triggers are triggers 6D and 10U respectively corresponding to the memory location 70.

At the end of the following times A, triggers 9U, 8U, 7U . . . 2U, are switched in turn, whereas triggers 10U, 9U, . . . are reset in turn. The result is the successive control of trigger combinations 6D–9U, 6D–8U . . . 6D–2U, 6D–1U, corresponding to the memory locations referenced 69, 68 . . . 62, 61, respectively. Then there are controlled the trigger combinations 5D–10U, 5D–9U . . . corresponding to memory locations 60, 69, . . . . Generally speaking, all trigger combinations corresponding to the systematic scanning of the various positions of a memory are energized, scanning being effected in an order inverse to the numbering.

The scanning chains are connected in a ring, consequently it is necessary to stop the scanning operations when location 1 is reached to avoid going on through location 80. The trigger combination for this location is 0D–1U. Said triggers being supposed switched, line 213 and **216*a*** (Figs. 2*d* and 2*b*) are at a positive voltage as are lines 191 and **193*a* during the following time A. A connection from these lines reaches AND circuit 341** (Fig. 2*d*) which is thus simultaneously energized on both its inputs, applying a positive voltage to line 342 thereby. It was assumed that lead 206 (Fig. 2*e*) was at a positive voltage, thus AND circuit 343 has a positive voltage applied on both its inputs. A positive voltage is thus applied to OR circuit 291, which results in bringing the voltage of line 243 to a positive value. The result to be later described further is that scanning chain advance is blocked.

The advance pulse may also be applied so that chain A scans the various memory locations according to their numbering increasing order. In such a case, it will suffice to turn line 206 negative (Fig. 2*e*) and line 207 positive. The voltage of line 181 is then applied to AND circuit 344 and to line 345 (see also Figs. 2*c* and 2*b*) which controls circuits so disposed that the scanning of the memory location is effected according to their numbering order. The above explanations enable an understanding of the operation of these last mentioned circuits, therefore they will not be described further. The scanning is stopped as soon as the chain reaches location 80, by the operation of AND circuit 346 (Fig. 2*c*) in a way similar to that just described.

The operation of chain B is quite similar to that of chain A, except that it is operated during time B under the voltage control of line 265 (Figs. 2*b* through 2*f*).

*General control circuits.*—It is necessary to cause each stage of program to start (and jointly to cause the setting out of action of the program just completed); to cause the setting of the scanning chains; to search for the nature of the arithmetical operation to be performed, the sign of each factor and the nature of the operation controlled being taken into account; to proceed, on occasion, to the search for the sign of each factor if it is not in its normal location; to proceed also to various operations of correction if the result of the arithmetical operation has not the anticipated sign.

The whole of these operations is controlled by triggers B3 through B13 (Figs. 2*f* and 2*g*) the functions of which, more particularly, are:

B3—setting into action each stage of the program and taking out of action the stage operated previously.

B4—setting into action the scanning chain which controls memory field A in order to search for the sign of the value contained in this memory field, if this sign is not in the lowest ordered position (for factor *b*, it is assumed that the sign always is located in the lowest ordered position).

B5—search for the sign of the value contained in memory field A if this sign is not in the lowest weight location.

B6—setting the scanning chains which control memory fields A and B in the locations of said fields corresponding to the lowest order.

B7—search for the sign of the values contained in memory fields A and B.

B8—(Fig. 2*g*) control of the arithmetical operation.

B9—various controls relating to digits of the lowest order.

B10—check of digit exhaustion in memory field A.

B11—control of correction operations in the case of a complement result.

B12—(Fig. 2*f*) control of the addition and subtraction.

B13—(Fig. 2*g*) control of the carries.

Triggers B3 through B11 are switched by pulses from line 125 (also refer to Fig. 2*g*), which pulses coincide in time with the switching pulse delivered by AND circuit 121, that is, with the end of a time B.

These triggers (B3 through B11) control each other, e.g., they form a chain; however, there are cases where two or several triggers may happen to be switched simultaneously. A better understanding of the circuits and how the different operations fit together will presently be discussed.

Trigger B3 always is switched at the beginning of the program and reset to its initial state at the end of the program.

The succession order of switchings and the period during which triggers B4 through B11 remain switched are variable according to the size of fields A and B, the sign location, and the result of the operation, a true value or a complement. This order is as follows in the case of an operation involving a sign search and a result in true value and in the case of an operation without sign search but with a primary result in complement value: It will be assumed that the size of fields A and B are respectively 4 and 6 digits. An indication is also made of the time during which some of these triggers remain switched, when this period is higher than the period of times A and B.

(1) Operation with sign search and result in true value. The succession order of the switchings of triggers B4 through B11, is as follows:

B4
B5
B6
B7
B8 B9
B8 alone during three consecutive periods.
B8–B10 during three consecutive periods.
B3

(2) Operation without sign search but with a primary result in complement value:

B6
B7
B8 B9
B8 alone during three consecutive periods.
B8–B10 during three consecutive periods.
B11–B6
B11–B7
B11–B8–B9
B11–B8 during six consecutive periods.
B3

Conditions under which triggers B12 and B13 are switched will be examined hereafter as necessary.

*Start of a program stage.*—Assume a connection linking hub 129 (Fig. 2*j*) with program step control hub 130 (Fig. 2*e*) connected to trigger P1. Trigger B2 (Fig. 2*j*) being initially restored as indicated in the drawing by a dot located on the right side in the square representing symbolically this trigger, output line 110, at the same conductive side, has a positive voltage and impresses this positive voltage on hubs 129 and 130 (Fig. 2*e*) due to the above-mentioned connection. AND circuit 131 is thus conditioned to pass signals from line 134.

With trigger B1 (Fig. 2*j*) also restored, line 122*a* is at a positive voltage as is line 132*a* from AND circuit 123*a* when line 103 is positive. Thus, from an examination of Fig. 3, it may be seen that trigger B1 is switched only at the end of the first pulse delivered by line 103 (vertical line 126). Line 125*a* from inverter 124*a* is positive initially, and goes negative when the first pulse on line 103 appears.

Figure 2G:
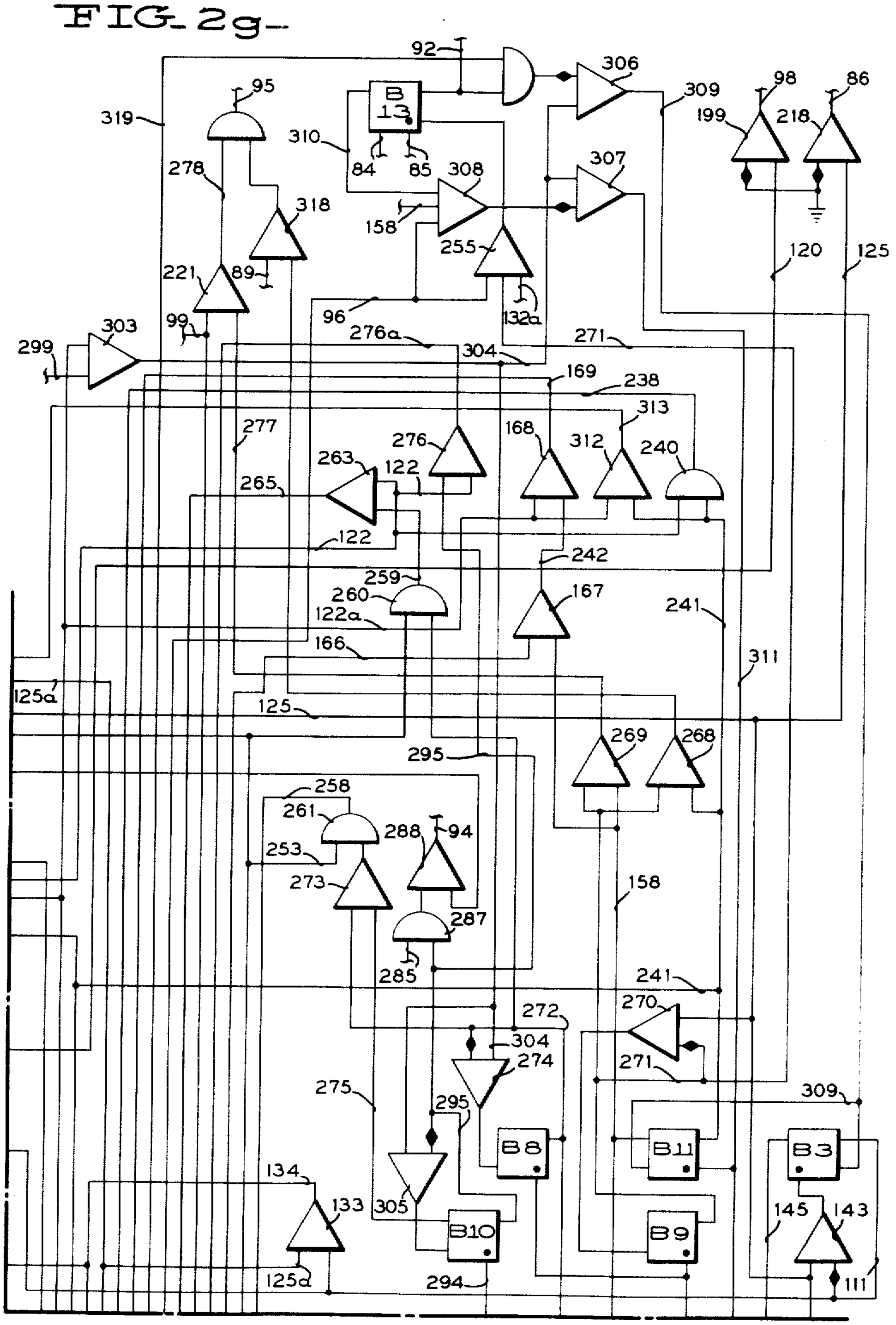
Figure 2H:
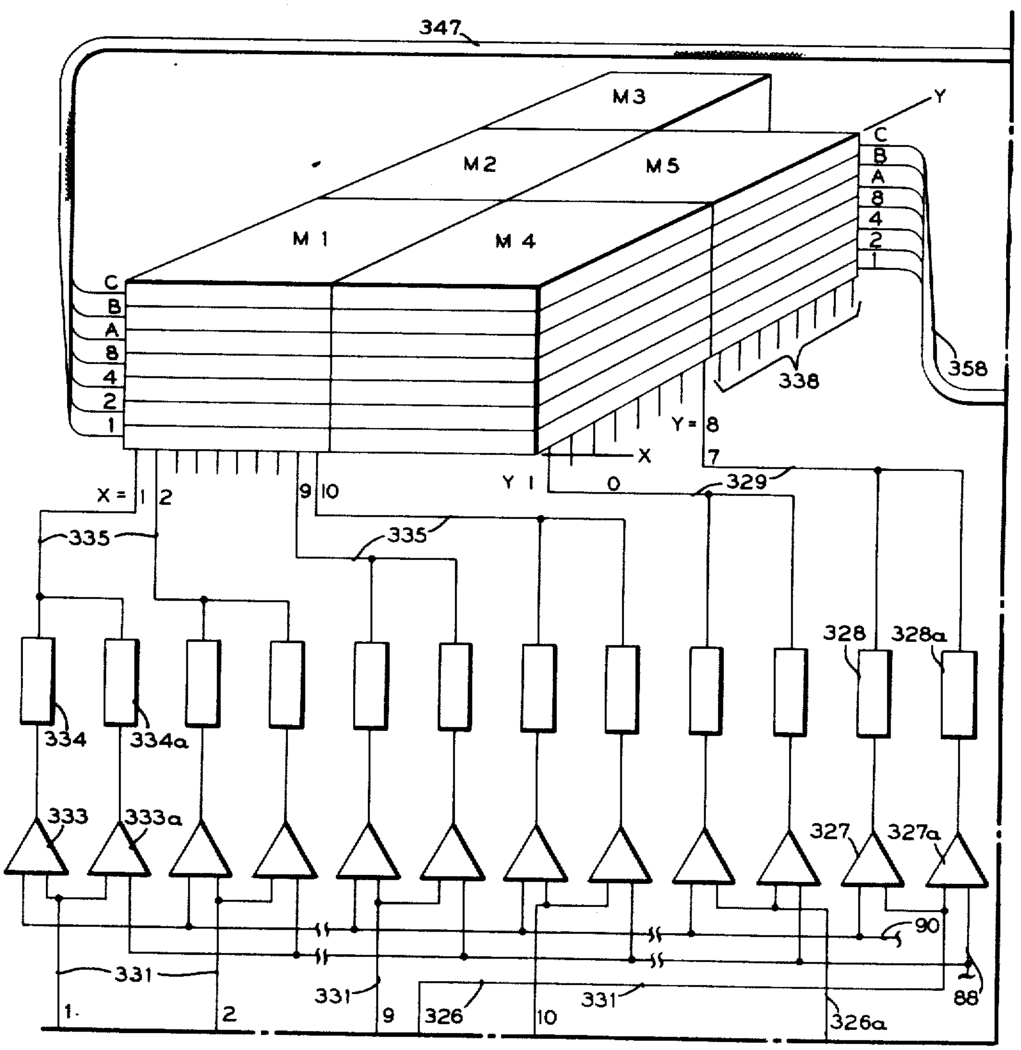

Line 125*a* controls AND circuit 133 (Fig. 2*g*).

Since trigger B3 is also initially restored, output 111 is positive, thus conditioning AND circuit 133. Output line 134 therefore will follow the voltage conditions of line 125*a*. This line leads to AND circuit 131 (Fig. 2*e*), and it is to be noted that the voltage on this line is initially positive. Therefore, no effect is produced when lines 125*a* and 134 go negative.

As the pulse on line 103 ends (Fig. 2*j*), line 132*a* goes negative, thus causing a return to a positive voltage on line 125*a*. Line 134 follows so that a pulse at that time is transmitted through AND circuit 131 (Fig. 2*e*) which causes trigger P1 to switch. Output line 135 thus turns positive and likewise hubs 137, 138 and under certain conditions, hubs 139 and 140. The first hubs are connected to line 135 through diodes 141.

At the same time the voltage on line 134 is fed to AND circuit 142 (Fig. 2*j*) which now is conditioned to conduct due to line 110 which has a positive voltage. In a similar manner, trigger B2 is switched. Line 110 thus comes back to a negative voltage as do hubs 129 and 130 (Fig. 2*e*), which previously prevents any new start of program P1. AND circuit 112 (Fig. 2*j*) henceforth is blocked, so that line 109 assumes a negative voltage. Inverter 116 restores a positive voltage to line 117, which then conditions AND circuit 118 and enables the generator of pulses to work continuously.

Before examining the action of the pulses delivered by hubs 137 through 140 (Fig. 2*e*) let us describe how trigger B3 (Fig. 2*g*) is switched. AND circuit 143 receives on one side the line 111 and on the other side a connection from line 125 which are both initially positive.

When the first pulse on line 103 (Fig. 2*j*) appears, line 125 remains positive since AND circuit 123 remains blocked due to line 122 which is negative. This line 122 becomes positive when trigger B1 is switched, but AND circuit 123 remains blocked due to the fact that line 103 has already come back to a negative level. When the second pulse on line 103 appears, AND circuit 123 is conditioned on both its inputs, thus producing a positive voltage on line 132 and a negative voltage on line 125, due to the presence of inverter 124. No effect on trigger B3 is produced (Fig. 1*g*) because of the particular arrangement of circuit 143. As the pulse on line 103 (Fig. 1*h*) ends, line 125 again becomes positive, causing the transmission of a pulse through AND circuit 143 (Fig. 2*g*), which in turn causes trigger B3 to switch and voltage in line 111 to come back to a negative value.

It should be noted that the switching of trigger B3 is shifted with respect to the switching of trigger P1 (Fig. 2*e*). The latter is performed at the end of a time A while the first is performed at the end of next time B. Within that interval various operations may be performed, which are to be analyzed now.

*Search of the sign.*—Assume that, for the moment, the program initiated from trigger P1 (Fig. 2*e*) controls the readout of a factor contained in a certain memory filed A and comprising a sign which is not in the location of that field corresponding to the lowest order. Connections as follows then are needed:

(1) Hub 137 to one of hubs 146, i.e. hub 146*a*.

(2) Hub 147*a* to one of the operation hubs (addition or subtraction) as will be discussed hereafter.

(3) Hub 148*a* to one of hubs 149, i.e. hub 149*n*.

(4) Hub 150*n* to one of hubs 152 (Fig. 2*a*) i.e. hub designated 152–1, if the sign is to be searched in the first memory unit.

(5) Hub 151*n* (Fig. 2*e*) to one of the hubs 153 (Fig. 2*a*) i.e. to the hub also designated 71, if the sign is to be searched in position 71.

With regard to the second of the above mentioned connections, it should be noted that the operation could have been controlled from hub 137 (Fig. 2*e*). Hub 147*a* serves the purpose of a repeater in case the number of controls performed from the same hub should be more than one in order to limit the current. It is thus possible to arrange the circuits feeding hubs 137 and 138 (and all similar hubs) so that these circuits allow a single control to be effected; in connection with this, the normal function of hub 137 is the control of the nature of the operation (addition, subtraction, transfer), whereas the normal function of hub 138 is the control of the next stage of program. It is not possible to use the hubs this way if a sign search must also be effected, since then, one of hubs 137 or 138 would be assigned to a double control. The output hub 147*a* is thus provided as a repeater. The diodes such as 141, inserted between line 135 and hubs 137 or 138 or diode 154 inserted between hubs 146*a* and 147*a* may be replaced by circuits similar to those represented in Fig. 9*a*.

It has been mentioned, trigger P1 (Fig. 2*e*) is switched before trigger B3 (Fig. 2*g*) is switched. The switching of trigger P1 corresponds in Fig. 2 to the time of vertical line 126, while the switching of trigger B3 corresponds in time to vertical line 127. Line 135 (Fig. 2*e*)

subsequently has a positive voltage, as do hubs 137 and 146a (due to the connections previously mentioned). Line 155 is also at a positive voltage by virtue of the connection through diode 156.

Line 155 applies this positive voltage to one of the inputs of AND circuit 157 (Fig. 2*f*). At the same time a positive voltage is applied to the second input through line 158. The latter comes from the non-conductive side of trigger B11 (Fig. 2*g*). Output line 159 (Fig. 2*f*) is thus positive to condition AND circuits 160 and 161 to conduct. Line 162 has a negative voltage due to the presence of inverter 163. AND circuits 164 and 165 are thus blocked.

It should be noted that AND circuits 161 and 165 are connected to line 145, which comes from the left side of trigger B3 (Fig. 2*g*). Initially, this line has a negative voltage, but will turn positive once trigger B3 is switched. Transmission of a pulse is taken therefrom through one of AND circuits 161 or 165 (Fig. 2*f*) which causes triggers B4 or B6 to be switched. It should be noted that this switching depends on the voltage conditions of lines 159 and 162, which in turn is dependent on the voltage condition of line 155 (Fig. 2*e*). Depending on whether or not a sign search is to be made, the trigger chain of Fig. 1*f* will be started at B4 or B6. It has been assumed that a connection linked hub 137 (Fig. 2*e*) with hub 146a, so that line 155 would have a positive voltage and switch trigger B4.

*Switching period of trigger B4.*—Switching of trigger B4 is performed at the end of a time B. This trigger remains switched during next times A and B and resumes its initial state at the end of this time. During this period, line 166 (Fig. 2*f*) assumes a negative voltage, blocking AND circuits 167 (Fig. 2*g*) and thus 168. Line 169 is thus negative. The latter leads to AND circuit 170 (Fig. 2*e*) blocks and makes negative hub 139. Connections achieved from this hub thus are made inoperative. Line 171 (Fig. 2*f*) assumes a positive voltage (due to the switching of trigger B4) and conditions AND circuits 172, 173, 174. This results in the following:

Since line 122a also has a positive voltage (time A) line 175 from AND circuit 172 and line 176 from OR circuit 177 assume a positive voltage level. Line 175 leads to AND circuit 178 (Fig. 2*e*) which is already conditioned on its second input due to the positive voltage of hub 146a. Voltage of hub 148a therefore assumes a positive level as does hub 149n to which 148a is connected. With line 176 also positive, AND circuit 179 produces an output to hubs 150n and 151n. Hub 152-1 (Fig. 2*a*) and hub 153 referenced 71 thus assume a positive voltage level due to the fourth and fifth above-mentioned connections. The result is the activation of AND circuit 200 and the application of a positive voltage to lines 201-1 and 202-7. Line 201-1 passes through Fig. 1*b* and 1*c* and leads to AND circuit 203 (Fig. 2*d*). Line 202-7 (Fig. 2*a*) leads to AND circuit 204 (Fig. 2*b*).

A connection from line 176 designated 176a (Fig. 2*e*) passes through Figs. 2*e*, 2*d*, 2*c*, 2*b*, 2*a*, and leads to AND circuit 203 (Fig. 2*d*) which enables control of trigger 1U, AND circuit 204 (Fig. 2*b*) which enables control of trigger 7D, and AND circuit 182 (Fig. 2*a*). At the end of time A, the voltage on line 103 (Fig. 2*j*) goes positive as does the voltage on line 132a since the voltage on line 122a is then positive. Line 132a leads to AND circuit 182 (Fig. 2*a*) which is conditioned by the positive voltage on line 176a. Line 144 thus applies a positive voltage to the right side of trigger 1M through AND circuit 200, causing this trigger to be switched.

As has been discussed, trigger 1M controls the first memory unit.

AND circuit 173 (Fig. 2*e*) receives on its second input the voltage of line 125a. Output line 180 follows the voltage conditions of the latter as does line 181. The latter leads to AND circuit 205 (Fig. 2*e*). Suppose that line 206 has a positive voltage (line 207 having a negative voltage), then line 208 has a positive voltage level which traverses Figs. 1*d* and 1*c* and leads to AND circuit 215 (Fig. 1*b*). When line 176a has a positive voltage so does line 210, OR circuit 209 equalizes the voltages.

The foregoing lines and circuits will thus follow the voltage conditions of line 125a (Figs. 2*e* through 2*h*).

It has been seen that AND circuit 203 (Fig. 2*d*) has a positive voltage applied to both its inputs. The output line therefore is at a positive voltage as is line 211 which leads to AND circuit 212. The latter receiving its second input from line 208, will transmit a first switching pulse which is directed to the left side of trigger 2U and to the right side of trigger 1U. This does not trigger 2U, due to the fact that this trigger already conducts at its right side. On the other hand, trigger 1U is switched, and thus gives line 213 a positive voltage level.

The voltage on line 214 (Fig. 2*b*) is also positive and results in a second switching pulse transmitted through AND circuit 215, which causes trigger 7D to switch.

Triggers 1U and 7D control the location of memory designated 71, which is that containing the sign as was assumed. Switching of triggers 1U and 7D is performed at the end of a time A. Sensing of the corresponding location in the memory will be performed during next time A, under control of trigger B5 (Fig. 2*f*).

In summary, switching period A of trigger B4 corresponds to the operation of the organs controlling the location of the memory to which access is to be given. Nothing occurs during time B, except, at the end of this time, the return of trigger B4 to its initial state and the control of trigger B5. This result is obtained through AND circuit 174 which receives on its second input the voltage of line 125. This results in a switching pulse at the end of time B; which pulse is directed to the left side of trigger B4 and to the right side of trigger B5. Trigger B4 thus comes back to its initial state, while trigger B5 is switched.

*Switching period of trigger B5.*—The voltage on line 183 becomes positive, and conditions AND circuits 184, 185, 160, 186 and starts the following sequence during time A:

AND circuit 184 has its second input connected to line 122a. The latter has a positive voltage thus lines 187, 188 and 189 will assume a positive level. A connection from line 188 traverses Figs. 2*e* through 2*a*. It leads first to AND circuit 190b (Fig. 1*d*) which is conditioned by its second input due to the switching of trigger 1U. Line 191 thus assumes a positive voltage.

A second connection from line 188 leads to AND circuit 192 (Fig. 2*b*) which is conditioned by its second input due to the switching of trigger 7D and due to the fact that line 216 has a positive voltage. Subsequently, the voltage on line 193 is also positive.

A third connection from line 188 leads to AND circuit 194 (Fig. 2*a*) which also is conditioned at its second input by the switching of trigger 1M. Subsequently, voltage on line 195 is positive. The general effects thereof will be examined later.

When line 196 (Fig. 2*f*) is positive, AND circuit 197 is conditioned at both its inputs, which develops a positive voltage on line 198. This line controls AND circuits 219, 220 (Fig. 2*j*) (effects thereof will be discussed later). For the present, let us simply observe that positive voltages on lines 191, 193, 195 and 198 control the read-out and re-write of the value contained in the memory position where access is to be had, and that the reading of this value is performed during these operations. Trigger AR (Fig. 2*i*) will be switched if this value bears "minus" sign which develops a positive voltage in line 99. This line goes to AND circuits 221 (Fig. 2*g*), 222 and 223 (Fig. 2*f*).

AND circuit 160 is connected to line 159, which has a positive voltage in the case considered. Lines 224 and 225 subsequently have a positive voltage, conditioning AND circuit 226. The latter receiving its second input from line 125*a* thus voltage on output line 227 follows the same variations.

It has been seen that the circuits controlled from line 125*a* essentially served the purpose of emitting various switching pulses. Consequently, in the case considered, a switching pulse is emitted by AND circuit 222, and applied simultaneously to both sides of trigger B12, which causes this trigger to switch its state. Voltage on line 96 thus goes positive.

Obviously, this switching of trigger B12 takes place only if line 99 has a positive voltage, that is if trigger AR (Fig. 2*i*) has been switched. As is to be seen, the switching of this trigger corresponds to the sensing of sign "minus" (so that this switching does not occur in the case of the sensing of a sign "plus," in which case the voltage on line 99 is negative).

It should be noted that there is no advance here of the scanning chains at the end of time A. The advance is controlled by the voltage on line 181 (Fig. 2*e*) which now is negative due to the fact that voltage on line 180 is negative, as is that on line 229. At the end of time A trigger B1 (Fig. 2*j*) is switched, and by the return of voltage in line 122*a* to a negative value, voltage in line 122 becomes positive.

During time B, voltage on line 132 goes positive, when voltage on line 103 goes positive. Line 132 is connected to AND circuit 185 (Fig. 2*e*), the other input of which is at a positive level. The voltage on line 230 thus becomes positive. This line may be traced back through Figs. 2*e* through 2*a* to the left side of triggers 1U through 10U (Figs. 2*c* and 2*d*) 0D through 7D (Fig. 2*b*) and 1M through 3M (Fig. 2*a*); these triggers that were switched (1M, 7D and 1U) thus are all restored to their initial state.

It has been seen that AND circuit 186 (Fig. 2*f*) also was conditioned. Line 125 feeds the second input of this AND circuit to produce a switching pulse at the end of time B which causes trigger B6 to switch its state and trigger B5 to be restored to its initial state.

*Switching period of trigger B6.*—Line 231 has a positive voltage, which conditions AND circuits 233 and 234. This line leads also to OR circuits 232 and 177, so that lines 176, 176*a* and 235 are also positive.

It has been seen that trigger P1 (Fig. 2*e*) had been switched and mention has been made also that hubs 137 and 138 respectively served the purpose of controlling the nature of the operation and the next program stage. Hub 139 serves the purpose of controlling the memory field operating to read-out, whereas hub 140 serves the same purpose for the memory read-out and substitution. Connections must be made as follows:

(1) Hub 139 to one of hubs 149, i.e. hub 149*b*.

(2) Hub 150*b* to one of hubs 152 (Fig. 2*a*), i.e. hub 152–1 if the memory field controlled for read-out corresponds to memory 1.

(3) Hub 151*b* (Fig. 2*e*) to one of hubs 153 (Fig. 2*a*) i.e., to that of hub also designated 71 if the digit of lowest order in the subtrahend is in location 71 (the same digit as above has been chosen for the sole purpose of avoiding the description of a plurality of similar circuits).

(4) Hub 140 (Fig. 2*e*) to one of hubs 149, i.e. hub 149*p* (not shown).

(5) Hub 150*p* (not shown) to one of hubs 152 (Fig. 2*a*) i.e. hub 152–2 if the memory field controlled for read-out and substitution corresponds to memory 2.

(6) Hub 151*p* (not shown) to one of hubs 153 (Fig. 2*a*), i.e. to that of hubs also designated 71 if the digit of lowest weight in the subtrahend is in location 71 (the same digit as above has been chosen for the purpose of simplifying the description and avoiding a complete new description of a plurality of similar circuits).

(7) Hub 137 (Fig. 2*e*) to one of the hubs which serve the purpose of defining the nature of the operation particularly to hub 236 (Fig. 2*f*) if this operation is to be a subtraction.

The circuit feeding hub 137 (Fig. 2*e*) as a rule, is so constructed as to allow only the operation of a single control. Accordingly, connections must be made in a slightly different way if a search for signs is to be performed. In this case, hub 137 must be connected to one of hubs 146, i.e. hub 146*a*, and the repeating hub 147*a* which must be used to control the operation, and this hub is consequently connected to hub 236 (Fig. 2*f*) if the operation is a subtraction. Hub 137 (Fig. 2*e*) is positive as are hubs 146*a*, 147*a* and accordingly hub 236 (Fig. 2*f*) and line 237.

Line 238 (Fig. 2*g*) is connected through OR circuit 240 to line 122. The voltage on line 238 is thus positive at each time B.

When trigger B11 is switched, line 241 is constantly positive, during during times A as well as times B, and consequently line 238 will be positive during this time.

Line 169 is connected to line 122*a* through AND circuit 168. Therefore it is positive for certain times A, more particularly every time line 242 is positive. The latter depends on AND circuit 167; it is positive every time voltages applied to this circuit are positive simultaneously, that is, every time triggers B4 (Fig. 2*f*) and B11 (Fig. 2*g*) are in their initial state. Voltage in the same line is negative every time any one of triggers B4 or B11 is switched. From the foregoing, the conditions under which hubs 139 (Fig. 2*e*) and 140 emit pulses are established.

Following are the results of switching trigger B6 (Fig. 2*f*):

*Time A.*—Line 169 (Fig. 2*g*) is positive as thus are hubs 139 (Fig. 2*e*), 149*b* (due to one of the above-mentioned connections), 150*b*, 151*b* (due to the positive level of line 176 at AND circuits 179*b*), 152–1 (Fig. 2*a*) and 153 also designated 71.

The positive voltage of hub 152–1 conditions AND circuit 200 which receives a second positive pulse from line 144. The result is the switching of trigger 1M, as already mentioned. At the same time, the positive voltage of hub 153 designated 71, causes the voltage on one of the lines of each group 201 and 202 to be positive to thus condition AND circuits 204 (Fig. 2*b*) and 203 (Fig. 2*d*.)

Line 243 (Fig. 2*e*) at this time has a negative voltage level. This line leads to inverter 244 (Fig. 2*e*.) Line 245 thus has a positive voltage, which conditions one of the inputs of AND circuit 246. This AND circuit receives on its second input the voltage of line 235, which also is positive. Then it allows a positive voltage to pass, which is applied to AND circuit 247. The latter receiving on its second input the voltage of line 125*a*, output line 229 follows the same voltage conditions as does line 181. The latter leads to AND circuit 205 (Fig. 2) which at present is conditioned to conduct by the positive voltage on line 206. Under these conditions, line 208 follows the same voltage conditions as exist on line 125*a*. Consequently, at the end of time A, triggers 1U (Fig. 2*d*) and 7D (Fig. 2*b*) are switched.

Scanning of memory location designated 71 is thus made possible as will more clearly appear hereafter.

*Time B.*—Line 238 (Fig. 2*g*) is positive and as a result hub 140 (Fig. 2*e*) is made positive. Hub 149*p* (not shown) is positive due to one of the above-mentioned connections. Hub 150*p* (not shown) and hub 151*p* (not shown) are at a positive potential due to an AND circuit 179*p* (not shown) and to the fact that line 176 is positive. Hub 152–2 (Fig. 2*a*) and hub 153 designated 71 are at a positive level because of the above-mentioned plug connections.

One of the lines of each group 201 and 202 thus takes a positive voltage, that is, line 7 of group 202, and line 1 of group 201. These lines are the same as those which were positive at time A, however, the results produced thereby are different. At the present time B, AND circuits 204 (Fig. 2*b*) and 203 (Fig. 2*d*) under control of line 7 of group 202, line 1 of group 201 and line 176*a* supply positive voltages to lines 214 (Fig. 2*b*) and 211 (Fig. 2*d*) since line 176*a* is positive. However, switching pulses are no longer delivered by line 208, but are delivered by line 208*a*. The voltage on the line 125*a* (Figs. 2*f* and 2*g*) remains unchanged during a time B, thus only circuits controlled from line 125 can deliver switching pulses. The latter feeds AND circuit 248 (Fig. 2*e*) which is conditioned on its second input by AND circuit 246. Line 249 thus responds to voltage conditions on line 125. Assuming that line 206 (Fig. 2*e*) has a positive voltage (and line 207 a negative voltage), line 208*a* responds to voltage conditions on line 249 through AND circuit 205*a*. Line 208*a* feeds AND circuit 212*b* (Fig. 2*d*) which is conditioned at its second input by line 211, now positive, to deliver a pulse which causes trigger 11U to be switched. Line 208*a* also feeds AND circuit 215*b* (Fig. 2*b*) which also is conditioned on its second input due to the fact that lines 214 and 210*a* are positive. The result is a second pulse which causes trigger 17D to be switched. The scanning chain constituted by triggers 11U through 20U (Figs. 2*c* and 2*d*) and 10D through 17D (Fig. 2*b*) is that way started to allow the scanning of a second memory position designated 71.

It has been seen that hub 152–2 (Fig. 2*a*) is at a positive voltage. AND circuit 250 thus is conditioned. At the end of time B, line 103 (Fig. 2*j*) becomes positive and through AND circuit 123 causes line 132 to go positive. Line 132 feeds AND circuit 251 (Fig. 2*a*). Line 176*a* is positive thus output line 252 is positive and subsequently the output from AND circuit 250. A positive voltage thus is applied to trigger 12M and causes it to switch.

It also has been seen that AND circuit 233 (Fig. 2*f*) was conditioned at one of its inputs due to positive line 231. This AND circuit may be activated if a connection has been made to hub 236. A line connected to line 125 and to AND circuit 233 causes leading to this element, a pulse to be emitted from AND circuit 233 to switch trigger B12.

Finally, another line connected from line 125 leads to AND circuit 234 which emits a pulse at the end of time B to cause trigger B7 to be switched and trigger B6 to be restored to its initial state.

*Switching period of trigger B7.*—Line 253 has a positive voltage which conditions AND circuits 254 (Fig. 2*j*), 256 (Fig. 2*f*), 257 and 164. Lines 258 (Fig. 2*g*) and 259 also have a positive voltage supplied through OR circuits 260 and 261 thus conditioning AND circuits 263 and 262 (Fig. 2*f*). This results in the following:

(1) *Time A.*—Line 122*a* has a positive voltage. Consequently a positive voltage is impressed on lines 264 (Fig. 2*f*), 188 and 198 and as was described under the heading "Switching Time of Trigger B5," lines 191 (Fig. 2*d*), 193 (Fig. 2*b*), and 195 (Fig. 2*a*) are at a positive level. These different voltages control the sensing of memory 1 at designation 71 (assuming connections set up corresponding to that location). It will be explained later how this sensing is performed. For the present, only the results will be discussed, particularly the switching of trigger AR (Fig. 2*i*) and the positive voltage feed of line 99 in case a "minus" sign would happen to be entered in the position considered. Two cases will be considered:

(*a*) The case of a sign search. Where the sign of the factor to be read from memory 1 is located at some position other than the lowest order and the sign if any in the lowest order is for another factor. This may be the case, for example, if the quantity which is to be recorded in memory 1 is from the sensing of a punched card. It is known that perforations in such cards can correspond first to a digital or alphabetical code, and the sign of a given factor contained in that card often is embodied in the form of a perforation designated "11" which may be in any column. The sign of a quantity punched in columns 65 through 71 for example may be in column 27. If the whole of the card has been entered in a memory i.e. memory 1, and if entry has been so performed that to each column in the card corresponds a memory location bearing exactly the same number, it is necessary to scan position 27 in order to get the sign and then scan locations 65 through 71 in order to have the factor.

In the case of a sign search, it has been seen that it is necessary to provide a connection between hubs 137 (Fig. 2*e*) and one of hubs 146, and that lines 155 and 159 (Fig. 2*f*) then have a positive voltage. Voltage on line 162 is negative, which blocks AND circuits 164 and 226.

(*b*) The case of no sign search where no connection has been made between hubs 137 (Fig. 2*e*) and 146. The voltage on lines 155 and 159 (Fig. 2*f*) is negative whereas voltage on line 162 is positive. AND circuit 164 is conditioned at both its inputs, which produces a positive voltage on line 225 and thus conditions AND circuit 226. Line 227 then follows the voltage conditions of line 125*a*, which causes a switching pulse to be transmitted through AND circuit 222 if line 99 also has a positive voltage, that is, if trigger AR (Fig. 2*i*) has sensed the presence of a minus sign in the memory location being scanned.

It should be noted that at the end of time A, trigger AR (Fig. 1*j*) is reset, and generally speaking, of all triggers bearing suffix R are reset at this time. Voltage on line 120 (Fig. 2*j*) initially is positive, and becomes negative when the pulse on line 103 come up. This voltage is directed into AND circuit 199 (Fig. 2*g*) which has its second input connected to ground. Subsequently output line 98 follows the voltage conditions of line 120. This line leads to Fig. 2*i* and controls the reset of triggers with suffix R.

Line 98 goes positive at the beginning of time A, so that a first reset cannot occur at that time. Switching of trigger R occurs at time A, coinciding with a pulse from line 101 (also refer to Fig. 2*j*). Voltage on line 98 then is invariable. It turns negative when pulse 103 comes up to take back a positive value at the end of this pulse, which coincides with the end of time A. Thus, a positive voltage is directed into all the triggers R (Fig. 2*i*) which causes all these triggers to come back to their initial state.

On the other hand, it should be noted that no pulse is developed which causes scanning chains to advance, that is, which controls the triggers with suffixes U (Figs. 2*d* or 2*c*) or D (Fig. 2*b*).

(2) *Time B.*—When the voltage on line 122 becomes positive, AND circuit 263 (Fig. 2*g*) allows a positive voltage to pass to line 265. Line 265*a* leads to OR circuit 266, so that lines 189 and 198 also have a positive voltage.

Line 265 traverses Figs. 2*e* through 2*a*, and conditions AND circuits 190*a*, 192*a* and 194*a*. Trigger 11U (Fig. 2*d*) having been switched, AND circuit 190*a* is conditioned with both its inputs, which imparts a positive voltage to line 191. Likewise, triggers 17D (Fig. 2*b*) and 12M (Fig. 2*a*) have been switched, which conditions AND circuits 192*a* and 194*a*, and imparts a positive voltage to lines 193 (Fig. 2*b*) and 195*a* (Fig. 2*a*). These voltages control the sensing of the memory location to which connections are assumed, that is location 71 in memory 2. This sensing will be described later. It should be noted now that a switching of trigger AR (Fig. 2*i*) may occur if the corresponding memory location contains a minus sign, which imparts a positive voltage to line 99 and conditions AND circuit 223 (Fig. 2*f*).

AND circuit 256 receiving an input from line 125 and line 167 follows the voltage conditions of line 125 so that AND circuit 223 may allow a switching pulse to pass, under conditions similar to those mentioned in the foregoing. This pulse is applied to trigger B12.

Figure 2I:
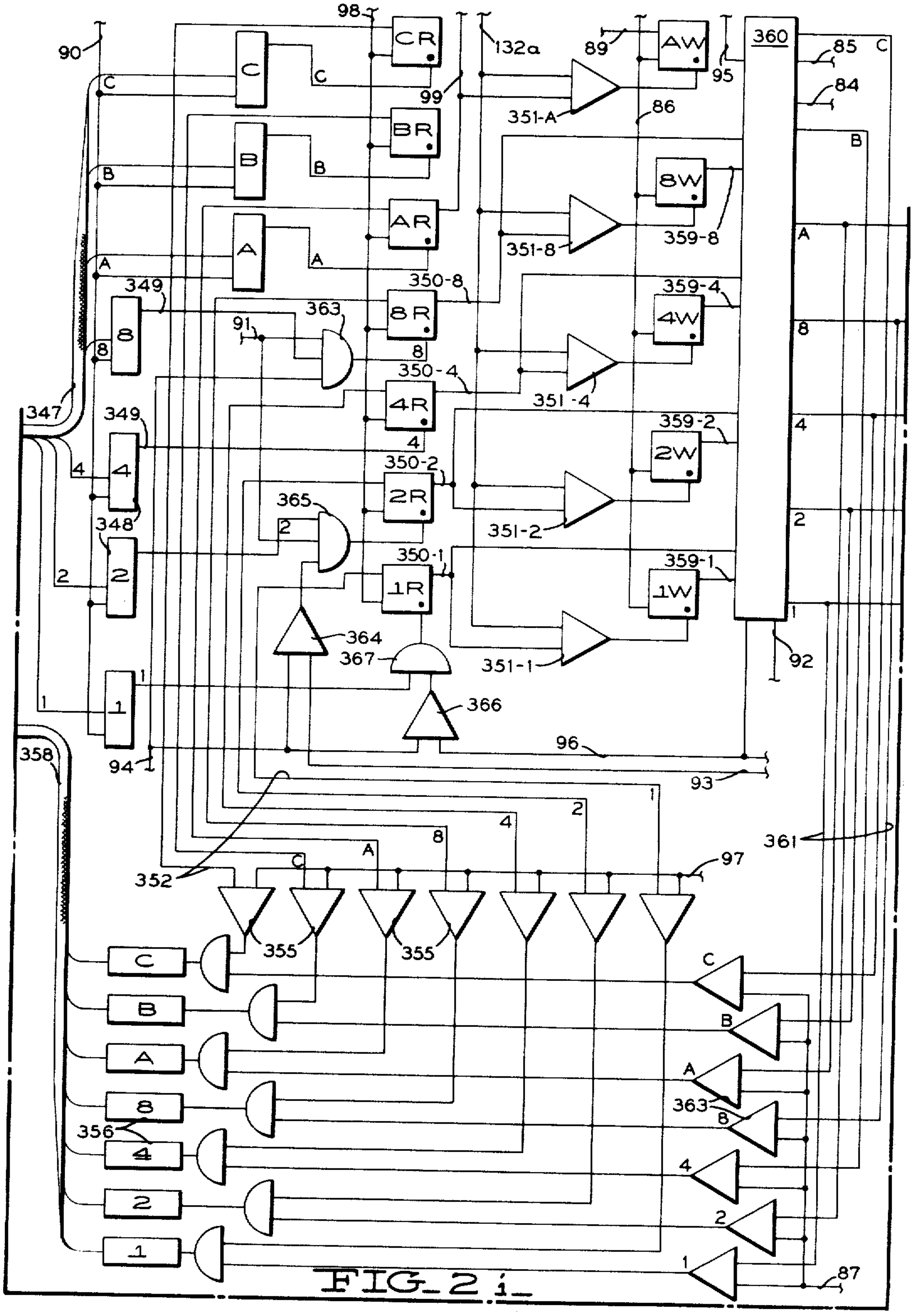

It should be noted that AND circuit 254 (Fig. 2*j*) is used for the purpose of re-writing the quantity sensed. Line 97 then made positive feeds AND circuits 355 (Fig. 2*i*). These circuits normally control the re-write at time A. Re-write at time B is normally controlled by AND circuits 363. The latter can be used in the case considered since adder 360 is not yet operating.

AND circuit 257 (Fig. 2*f*) receives on its second input a line from line 125. It delivers, at the end of time B, a switching pulse which causes the reset of trigger B7 to its initial state and triggers B8 and B9 (Fig. 2*g*) to be switched.

It should be noted that no pulse is applied to the chain constituted by triggers 11U through 20U and 10D through 17D (Figs. 2*b* through 2*d*).

*Switching period of triggers B8 and B9.*—Trigger B8 controls arithmetical operations. It remains switched until the factors are exhausted. Trigger B9 more particularly controls the operations relating to the unit digits. In order to give a clear understanding, the example in the foregoing is taken again, that is the addition of factor $a=321$ with factor $b=8765$, the result of the addition being substituted for $b$. So far, it has been supposed that the unit digits of factors $a$ and $b$ were respectively in location 71 of memories 1 and 2, but let us suppose now that these factors respectively are in locations 72 through 75 of memory 1 for factor $a$, and locations 72 through 77 in memory 2 for factor $b$, scanning chains being, at the beginning of these operations respectively in locations 75 and 77. Factor $a$ is controlled by chain A whereas factor $b$ is controlled by chain B.

(1) *Time A (Chain A in location 75).*—Trigger B8 (Fig. 2*g*) being switched, line 272 has a positive voltage as does line 275 due to trigger B10 in its initial state. AND circuit 273 allows a positive voltage to pass, which is applied to line 258, AND circuit 262 (Fig. 2*f*), line 188 and line 198. These voltages control the sensing of position 75 in memory 1, that is the position containing digit 1 of the units. Mention should be made of the triggers R (Fig. 2*i*) which are switched during that time, and reset at the end of the same time, and other triggers W also switched, but reset at the end of time B.

The voltage on line 272 (Fig. 2*g*) is applied to OR circuit 232 (Fig. 2*e*) and thus to AND circuits 246 and 247. The latter receives on its second input the voltage of line 125*a* which then is applied to lines 229 and 181. The result is, at the end of time A, a switching pulse which causes chain A to reach position 74. That is to be discussed in detail later.

Since trigger B9 (Fig. 2*g*) is also being switched, line 271 has a positive voltage, which conditions AND circuit 255. The latter also receives line 96 which has a positive voltage if the state of trigger B12 (Fig. 2*f*) is opposite to its initial state. This is the case where factor $a$ must be subtracted from factor $b$. AND circuit 255 (Fig. 2*g*) also receives a connection from line 132*a* (Fig. 2*j*) which is positive when pulse 103 comes up. The result is a positive output pulse applied to the right side of trigger B13 (Fig. 1*g*) to switch this trigger. As will be seen, trigger B13 generally controls the carries from location to location; it is controlled at the beginning of subtraction in order to perform the complement of 10.

(2) *Time B (Chain B in location 77).*—Line 272 is at a positive level as are lines 259, 265 (due to the fact line 122 has a positive voltage during time B) and 198 (Fig. 2*f*). These voltages control the sensing of position 77 in memory 2 which is the positions containing digit 5 of the units in factor $b$. As will be seen, these voltages control the addition of the digit read-out at the preceding time and also the re-write of the addition result.

AND circuit 248 receives on one of its inputs the voltage of line 125 and applies this voltage to line 249. As a result, at the end of time B, a switching pulse causes chain B to advance to location 76, as will be seen in detail later.

AND circuit 269 (Fig. 2*g*) is conditioned on both its inputs due to the positive voltages of lines 271 and 158, trigger B11 being reset. Line 277 thus is positive as is line 278 and line 95 if line 99 is positive. As will be seen, a positive voltage on line 95 controls the re-write of a minus sign in the position of factor $b$ corresponding to the lowest order.

Voltage on line 125 is also applied to AND circuit 270. As a result a switching pulse causes the reset of trigger B9 to its initial state.

(3) *Time A (Chain A in location 74).*—Lines 198 (Fig. 2*f*) and 188 are driven to a positive voltage which causes the second digit of factor $a$, 2, to be sensed. At the end of that time chain A is driven to location 73.

(4) *Time B (Chain B in location 76).*—Lines 265 and 198 are driven to a positive voltage, which causes the second digit of factor $b$, 6, to be read-out. At the same time, this digit is added to the preceding one, account being taken of the carry from the next lower order, the result of the addition, 8, being re-written instead of digit 6. At the end of that time, chain B is driven to location 75.

(5) *Time A (Chain A in location 72).*

(6) *Time B (Chain B in location 75).*—The operation processes as follows:

Sensing of the third digit, 3, of factor $a$,
advance of chain A to location 72,
sensing of the third digit, 7, in factor $b$,
addition of both these digits to produce 10,
re-write of 0 instead of 7,
advance of chain B to location 74.

(7) *Time A (Chain A in location 72).*

(8) *Time B (Chain B in location 74).*—

Sensing of the fourth digit, 0, of factor $a$,
advance of chain A to location 71,
sensing of the fourth digit, 8, of factor $b$,
addition of both digits, carry, from the lower order being taken into account to produce 9,
re-write of 9 instead of 8,
advance of chain B to location 73.

(9) *Time A (Chain A in location 71).*—Sensing of factor $a$ is completed. In this case, hub 139 (Fig. 2*e*) connected to hub 149*b*, a connection is made between hub 150*a* and that of hubs 153 designated 71 (Fig. 1*a*). Line 272 from trigger B8 (Fig. 2*g*) traverses Fig. 2*f* and leads to AND circuit 279 (Fig. 2*e*).

Lines 158 and 166 (Fig. 2*g*) have a positive voltage due to the fact that both triggers B11 and B4 (also refer to Fig. 2*f*) are in their initial state. AND circuit 167 thus allows a positive voltage to pass which is applied to AND circuit 168. Since line 122*a* is positive during time A, line 169, hub 139 (Fig. 2*e*) and hub 149*b* to which hub 139 is connected are also positive. AND circuit 279 thus is conditioned at both its inputs, supplying hub 150*a* with a positive voltage and also supplying that of hubs 153 designated 71 (Fig. 2*a*) that of lines 201 designated 1, and that of lines 202 designated 7 with a positive voltage.

These lines respectively lead to AND circuits 280 (Fig. 2*d*) and 281 (Fig. 2*b*). Line 188 (Figs. 2*a* through 2*f*) is also driven to a positive voltage as in the preceding cases.

Since the scanning chain is in location 71, triggers 1U

(Fig. 2*d* ) and 7D (Fig. 2*b*) are switched, developing a positive voltage on lines 213 and 216, and lines 191 and 193 to condition AND circuits 190*b* and 192 to allow a positive voltage to pass due to the positive voltage of line 188. These voltages are applied to AND circuit 280 (Fig. 2*d*) which causes line 282 to take a positive voltage to AND circuit 281 (Fig. 2*b*) which develops a positive voltage in line 283. Both these lines lead to AND circuit 284 (Fig. 2*d*) thus developing a positive voltage on line 285. A connection from this line leading to inverter 286 (Fig. 2*e*) causes line 196 to go negative, thus blocking AND circuit 197 and making line 198 negative. AND circuits 219 and 220 (Fig. 2*j*) are blocked, preventing any sensing of the corresponding location in the memory.

Another connection from line 285 leads to OR circuit 287 (Fig. 2*g*) thus conditioning AND circuit 288. Line 290 receives the voltage from line 101 (Fig. 2*j*) through AND circuit 289. Line 94 (Fig. 2*g*) goes positive. As will be seen, this voltage is used for controlling the insertion or substitution of a series of zeros for factor *a*.

A third connection from line 285 leads to OR circuit 291 (Fig. 1*e*) driving the voltage on line 243 to a positive value. Inverter 244 (Fig. 2*e*) restores a negative voltage which causes AND circuits 246 and 247 to be blocked. Line 229 remains negative, blocking the transmission of the advance pulses in chain A. Positive voltage of line 243 also causes AND circuits 292 and 293 to be conditioned. The latter receives the voltage from line 125*a* which is positive at the beginning of a time A. Voltage on line 294 thus is driven to a positive value. This voltage is applied to trigger B10 (Fig. 2*g*) causing an immediate switching of this trigger. Voltage on line 295 becomes positive, thus extending the application of a positive voltage to AND circuit 288. A connection from line 295 leads to AND circuit 276. The positive voltage on line 122 at time B is applied to the same circuit, developing a positive voltage on lines 276*a* and 230 (Fig. 2*e*). This voltage is applied to triggers 1U, 7D, 1M (Figs. 2*d*, 2*b*, and 2*a*) causing them to be reset.

In summary, the connection between hub 150*a* (Fig. 2*e*) and that of hubs 153 designated 71 (Fig. 2*a*) causes the switching of trigger B10 (Fig. 2*g*) and chain A to stop.

(10) *Time B* (*Chain B in location 73*).—The fifth digit of factor *b* is sensed. It is added to 0, so as to allow the carries to pass. At the end of that time, chain B is driven to location 72.

(11) *Time A* (*Chain A has stopped*).

(12) *Time B* (*Chain B in location 72*).—The sixth digit of factor *b* is sensed and added to 0 so as to allow the carries to pass. At the end of that time, chain B is driven to location 71.

(13) *Time A* (*Same as previous time A*).

(14) *Time B* (*Chain B in location 71*).—Scanning of factor *b* is completed. It is necessary to cause chain B to stop and also the sequence of the operations to stop. It has been assumed in the foregoing that hub 140 (Fig. 2*e*) was connected to a certain hub 149*p* (not shown). Hub 150*p*—1 (not shown) must also be connected to that of hubs 153 designated 71 (Fig. 1*a*) if it is desired that scanning operations controlled from chain B be stopped as soon as this chain arrives at location 71. In a way quite similar to that described previously a positive voltage on lines 283, 282 and 285 (Figs. 2*d* through 2*b*) is occasioned, however, this positive voltage now occurs during time B due to the fact that hub 140 (Fig. 2*e*) is now an emitter. As before, the result is:

A return of line 198 (Fig. 2*f*) to a negative voltage thus preventing the sensing of the corresponding location in the memory.

A conditioning of AND circuit 288 (Fig. 2*g*) which is of no effect due to the fact that line 190 cannot be positive except during time A.

A positive voltage on line 243 (Fig. 2*e*).

Line 245 (Fig. 2*e*) thus again is negative, blocking AND circuits 246 and 248 and preventing the transmission of any new advance pulse in chain B. At the same time, AND circuits 292 and 297 are conditioned, causing the positive voltage of line 125 to be directed to line 298. This voltage is applied to OR circuit 296 and line 230, which causes the reset of chain A. Line 298 leads also to trigger B14 (Fig. 2*e*) causing the switching of this trigger and a positive voltage on line 299.

Mention should be made that trigger B14 is switched at this time B, and that it remains in such condition until the end of next time A. AND circuit 300 is connected to line 125*a*. During the process of this time A, a positive voltage develops on line 290 (Fig. 2*j*) due to the fact that AND circuit 289 receives the voltage of line 122*a* and the voltage of line 101. Voltage on line 290 is applied to AND circuit 301 (Fig. 2*e*) driving the voltage on line 302 to a positive value. This voltage is applied to triggers 11U through 20U (Figs. 2*d* and 2*c*), 10D through 17D (Fig. 2*b*) and 11M through 13M (Fig. 2*a*) causing the reset of triggers 17D, 11U, and 12M and the stopping of chain B.

At the beginning of this time A, that is substantially at the end of preceding time B, AND circuit 303 (Fig. 2*g*) which receives the voltage on line 122*a* and the voltage from line 299 coming from trigger B14 (Fig. 2*e*) is again activated. Line 304 (Fig. 2*g*) thus goes positive. A connection from this line leads to AND circuits 274 and 305 which are thus conditionsd. This results in two switching pulses, which cause the reset of triggers B8 and B10 to their initial state. Another connection from line 304 leads to AND circuits 306 and 307, producing the following:

(1) Trigger B12 (Fig. 2*f*) is in its initial state which corresponds to an arithmetical operation equivalent to an addition of the absolute values of factors *a* and *b*. Line 96 has a negative voltage, and leads to the blocking of AND circuit 308 (Fig. 1*g*). Line 93 (Fig. 2*f*) has a positive voltage, developing a positive voltage on line 319 and conditioning AND circuit 306 (Fig. 2*g*). The latter thus may transmit a switching pulse over line 309, which causes trigger B3 to be switched and trigger B11 to be restored to its initial state.

(2) Triggers B12 (Fig. 2*f*) and B13 (Fig. 2*g*) are both switched. Line 310 has a negative voltage and blocks AND circuit 308. Line 92, has a positive voltage and conditions AND circuit 306 producing the same effects as above.

(3) Trigger B12 (Fig. 2*f*) alone is switched. This corresponds to operation "*b–a*," *a* having an absolute value higher than that of *b*. It is to be seen that the result of the operation in this case is a complement and that a correcting cycle is necessary to restore the true value. In this case lines 310 and 96 (Fig. 2*f*) both are positive, as is line 158 from trigger B11. AND circuit 307 is thus conditioned. A switching pulse is produced on line 311 which causes triggers B11 and B6 (Fig. 2*f*) to be switched and thus starts the correcting cycle.

*Correcting cycle switching period of trigger B11*.—There may be two cases:

(1) operation *b–a* with
$b=45$
$a=178$ (2) operation *b–a* with
$b=-45$
$a=-178$ The subtraction is effected by adding the 10's complement. Thus in the first case, we have:

$$\frac{999845}{999867}$$

The absence of carry on the left indicates the complement form.

As has been seen, the magnitude of *b* is greater than that of *a*; consequently, the sign of *b* is the sign of the difference. The above-mentioned result thus assumes the positive sign and must be converted into 133 which assumes the negative sign.

Likewise, in the second case, the result of the operation is 999867 with a negative sign, and is to be converted into 133 with a positive sign.

Thus the correcting cycle comprises two principal operations: (1) Conversion of the result into its 10's complement form; (2) Inversion of the negative sign.

For the convenience of the demonstration, let it be assumed that the result is recorded in memory 2, in locations 72 to 77.

The operations of the correcting cycle will be effected by positioning both scanning chains A and B in the same memory field; by extracting, in turn, each digit to be transformed during time A; by deleting the re-writing by the end of that time; and by re-writing the transformed digit at the end of time B.

In other words, the operation effected will be:

$$0-a=b'$$

*a* being value 999867 in the hereindescribed case. Since at the end of time A, no digit has been re-written, it will be necessary to effect a substitution of zeros during time B, so as to keep the adding system in a working condition.

With trigger B11 switched, wires 241 and 158 (Fig. 2*g*) have a positive voltage and a negative voltage respectively, with the following resulting effects:

(1) AND circuits 167 and 168 are blocked so as to drive wire 169 negative to block AND circuit 170 (Fig. 2*e*) and to make inoperative the connections existing from hub 139.

(2) Wire 238 receives a positive voltage (Fig. 2*g*) so as to enable AND circuit 239 (Fig. 2*e*) and so that the connections with hub 140 may be operating during time A as well as during time B.

(3) A positive voltage is applied to the right side of trigger B12 (Fig. 2*f*) so as to keep it constantly switched whatever may be the pulses provided by AND circuits 222, 223 and 233.

(4) A positive voltage is applied to AND circuit 312 (Fig. 2*g*) to thus drive line 313 positive during times A. Line 314 (Fig. 2*j*) from inverter 315 is driven negative to block re-write control AND circuit 316.

(5) A positive voltage is applied to AND circuit 317 (Fig. 2*j*) so that line 91 may be positive during times B simultaneously with line 101.

(6) AND circuits 269 (Fig. 2*g*) and 221 are blocked to make inoperative the normal sign re-writing circuit.

(7) AND circuits 268 and 318 are conditioned to cause the sign inversion.

(8) AND circuit 157 (Fig. 2*f*) is blocked so as to make the special sign search circuits inoperative.

With trigger B6 being also switched there results first a starting of the scanning chains, as previously described, with the difference that said starting is entirely controlled by the connections from hub 140 (Fig. 2*e*) since this hub is an emitter during times A as well as during times B. Consequently, scanning chains A and B will start from the same location in the same memory.

Trigger B7 (Fig. 2*f*) is then switched as previously indicated. Nothing special happens since, if trigger B12 receives switching pulses from any of AND circuits 222, 223 or 233, these pulses are immediately made inoperative because of the positive voltage applied to line 241.

Triggers B8 and B9 (Fig. 2*g*) are then switched as previously indicated as is trigger B13. AND circuit 268 is conditioned on both its inputs, thus permitting the sign inversion as will be seen later.

The scanning chain stopping is effected in the previously described manner under the complete control of the connections from hub 140 (Fig. 2*e*). Generally the resulting effect is, as previously, a switching of trigger B14, and an application of a voltage to line 299. AND circuit 303 (Fig. 2*g*) will be operated in the previously described way, thus conditioning AND circuits 306 and 307. However AND circuit 308 is now blocked since line 158 has a negative voltage. Line 241 has a positive voltage level as does line 319 (Figs. 2*f* and 2*g*) so that a switching pulse may be transmitted by AND circuit 306 through line 309 towards trigger B3.

*Switching period of trigger B3.*—The switching of trigger B3 constitutes the end of a program stage. There results an advance pulse which is sent through line 134 at the end of time A. This pulse is applied to AND circuit 320 (Fig. 2e) causing trigger P1 to return to its initial condition. This pulse may also be applied to AND circuit **131*a* if it is desired that the program stage controlled by trigger P2 follow the one controlled by trigger P1. It is then necessary to connect hubs 138 and 130*a*. This pulse may also be applied to AND circuit 321** (Fig. 2*j*) if the program stage which has been effected is the last one. In that case hub 138 (Fig. 2*e*) or the analogous hub of the last program stage active, must be connected with hub 322 (Fig. 2*j*). Trigger B2 is thus reset to its initial condition causing a positive voltage to appear in line 110. Line 111 also has a positive voltage, since trigger B3 (Fig. 2*g*) is reset. AND circuit 112 (Fig. 2*j*) is also conditioned on both its inputs, causing a positive voltage to appear on line 109 and a negative voltage on line 117. AND circuit 118 is then blocked, thereby turning off the pulse generator.

Let us also mention that at the end of a program stage (or the beginning of the following one) triggers B12 and B13 must be restored (Fig. 2*g*). This may be done by means of one of the pulses delivered during the switching time of trigger B3.

*Arithmetic operations.*—The arithmetic operations concerning the addition of two digits will now be described with more details. The operations for adding two numbers having any number of digits, are but a redundancy of the elementary operations which are about to be described.

Let it be assumed that the operation to be performed is of the type $a+b=b'$, *a* and *b* having the respective values 7 and 5 for example. Moreover, let it be assumed that *a* is stored in location 71 of memory 1, so that triggers 1M (Fig. 2*a*), 7D (Fig.2*b*) and 1U (Fig. 2*d*) are switched, likewise *b* will be supposed stored in location 71 of memory 2 so that triggers 12M (Fig. 2*a*), 17D (Fig. 2*b*) and 11U (Fig. 2*d*) are switched.

The arithmetic operations are generally controlled by trigger B8 (Fig. 2*g*). It may be assumed that trigger B9 is also switched. We shall examine the various cases when one trigger B12 (Fig. 2*f*), B13 (Fig. 2*g*), B10 or B11 is also switched.

*Time A.*—Line **122*a* has a positive voltage as well as line 272. AND circuit 273 transmits a positive voltage which is successively applied to line 258 and to AND circuit 262** (Fig. 2*f*); to line 188 (Figs. 2*a* to 2*f*); and to line 198 and to AND circuits 219 and 220 (Fig. 2*j*).

Triggers 1M, 7D and 1U being switched (see Figs. 2*a*, 2*b* and 2*d*) leads 217, 216 and 213 are at a positive voltage and as was seen above, lines 195, 324, **324*a*, 193, 326, 191 and 331–1 are also at a positive level. Lines 326 and 331–1 are directed to coincidence circuits 327, 327*a* and 333, 333*a*** (Fig. 2*h*) respectively.

(*a*) *Results occurring during pulse 101.*—The voltage of line 101 is applied to AND circuit 219, which is already conditioned since line 198 is at a positive voltage, and therefrom to line 90 (see also Fig. 2*h*) to AND circuits 327 and 333 also already conditioned to apply pulses to units 328 and 334. These units, which are described in French patent application Serial No. 712,511 filed on April 12, 1956, and corresponding to Docket 5451, are emitters capable of providing a current with a carefully defined intensity of magnitude less than required to switch a magnetic core, if this current only is applied. The current delivered by unit 328 is applied to all memory locations corresponding to ordinate $y=8$. Likewise the current delivered by unit 334 is applied to all memory locations corresponding to abscissa $x=1$. As was mentioned above, these currents are not sufficient alone to change the magnetic state of the cores, however, their effects will be added for the memory location in coordinates of which are $x=1$, $y=8$.

In this latter case, it is known that, the currents are so determined as to give all the cores at this location the same magnetic state, and particularly to switch all cores having a different magnetic state. Conventionally the first state will be called "neutral state" and the second state "active state." The core rows conventionally represent (according to the example adopted for the type of code) digits 1, 2, 4, 8 and the auxiliary elements A, B, C. Consequently if digit 7 is registered in the sensed memory location, cores 1, 2 and 4 are in the active state, whereas, core 8 is in the neutral state. Cores corresponding to the auxiliary element will not be discussed at present.

Figure 10A:
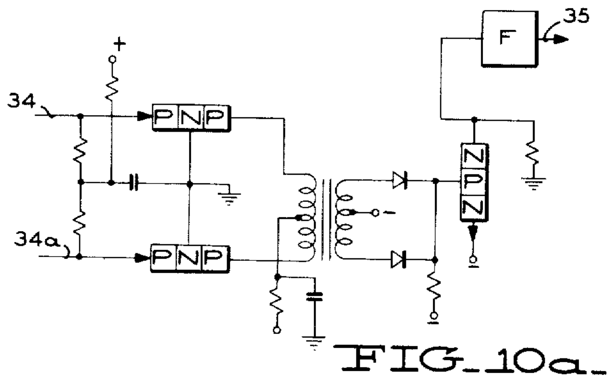

Switching of the cores from the active to the neutral state causes an induced current to be provided to lines 347 for acting on amplifiers 348 (Fig. 2*i*). The latter have been described in detail in Fig. 10*a*. They act only if line 90 is positive, which is now the case. They are labeled with index numbers 1, 2, 4, 8, A, B, C for the corresponding code elements. Some of the lines 349 are thus driven to a positive voltage (lines 1, 2, 4 in the illustrative example) said voltage being applied to triggers 1R, 2R, 4R, 8R, AR, BR, CR (the corresponding prefix corresponding to the code element). Thus triggers 1R, 2R, 4R are switched. The corresponding leads 350 have a positive voltage, thus conditioning the corresponding AND circuits 351. Corresponding lines 352 are at a negative voltage.

(*b*) *Results occurring in response to pulse 103 (Fig. 2j)*.—Line **132*a* is at a positive voltage, conditioning the second input of AND circuits 351** (Fig. 2*i*). Thus a positive voltage is applied to triggers 1W, 2W, and 4W to switch them.

Since line 198 is at a positive voltage (Figs. 2*f* and 2*g*) line 90 (Fig. 2*j*) from AND circuit 220 will also be at a positive voltage. Since line **122*a* is also positive, coincidence circuit 354 produces a positive voltage on line 97 and applies this to AND circuits 355** (Fig. 2*i*). Lines 352, designated by 8, A, B, C, in this example are at a positive voltage to apply a positive voltage to the corresponding current generators 356, the generators designated by 8, A, B, C. These current generators are identical to emitters 328, **328*a*** (Fig. 2*h*).

It is to be noted that AND circuit 312 (Fig. 2*g*) is blocked at present because trigger B11 is still in its initial state. Line 313 is at a negative voltage, causing lines 314 (Fig. 2*j*) and 88 to go positive (because of inverter 315). Thus AND circuits **327*a*** (Fig. 2*h*) and **333*a* are conditioned on both their inputs, causing current emitters 328*a* and 334 to be activated. These emitters are identical to emitters 328 and 334, however, their wiring is such that the current flows in a direction opposite to the preceding one. Emitters 328*a* and 334*a* transmit a current which by itself is not sufficient to change the state of a magnetic core. For the sake of demonstration, let it be assumed that emitters 328 and 334 provide a current $-\frac{1}{2}$ and that emitters 328*a* and 334*a*** furnish a current of $+\frac{1}{2}$. Both these currents will respectively be applied to all memory locations corresponding to ordinate $y=8$ and abscissa $x=1$. The effects will be added to each other in the memory location having coordinates $x=1$, $y=8$, thereby tending to turn active all cores in that position.

It has been seen that a positive voltage was applied to the emitters from group 356 (Fig. 2*i*) bearing further references 8, A, B and C. These emitters provide a current of $\frac{1}{2}$ in all magnetic cores of all memories corresponding to a same code element. Under these conditions, the core corresponding to element 8, in the memory location having as coordinates $x=1$, $y=8$ is traversed by the following currents:

$$+\tfrac{1}{2},\ +\tfrac{1}{2},\ -\tfrac{1}{2}$$

that is by a resulting current $+\frac{1}{2}$ which is not sufficient to change the magnetic state of that core. Likewise, as concerns the cores corresponding to elements A, B and C. Thus, only cores 1, 2, 4 will be switched to reset the considered location of the memory to its initial state (recording of a 7).

It has been seen that line 120 (Fig. 2*j*) was normally at a positive voltage and went negative as soon as a pulse on line 103 occurred. A connection from that line reaches AND circuit 199 (Fig. 2*g*) which has its second input connected to ground. Under these conditions, output line 98 provides a negative pulse when pulse 103 occurs, then a positive pulse when said pulse is ended. The pulse along line 98 is applied to triggers 1R, 2R, 4R, 8R, AR, BR, CR (Fig. 2*i*); it causes these triggers to be restored at the end of pulse 103, that is, at the end of time A.

*Time B*.—Line 122 is now at a positive voltage. It has been assumed that the digit to be read was a 5, stored in location 71 or memory 2 and that triggers 12M (Fig. 2*a*), 17D (Fig. 2*b*) and 11U (Fig. 2*d*) were switched. Again the operation is effected in two times, the first corresponding to line 101 being at a positive voltage (Fig. 2*j*) and the second to a positive voltage of line 103.

(*a*) *Results occurring in response to pulse 101*.—The readout of 5 is effected in a way quite similar to the above described process, thereby causing the switching of triggers 1R and 4R (Fig. 2*i*) and possibly AR in case the corresponding number should include a sign. Lines 350–1, 2, 4, 8 from triggers 1R to 8R and lines 359–1, 2, 4, 8 from triggers 1W to 8W are applied to the input of an adder 360 of any known type, which adds the digits entered therein, and depending upon the addition result, a number of the lines 361 are brought to a negative voltage. In the considered case, the sum of 7+5 is 12 so that only line 361 which is referenced 2, is driven negative. Line 85 takes a positive voltage thereby switching trigger B13 (Fig. 2*g*) and indicating that a carry is to be added during the following digit addition.

(*b*) *Results occurring in response to pulse 103*.—Since lines 122 and 90 (Fig. 1*h*) are positive, AND circuit 362 is conditioned on both its inputs, causing line 87 to be set at a positive voltage. The latter reaches AND circuits 363 (Fig. 2*i*) which also receives lines 361. Thus a positive voltage is applied to emitters 356, with the exception of the one also designated 2 (because corresponding line 361 is at a nagative voltage). Consequently, these emitters will provide a current of $-\frac{1}{2}$ which will be subtracted from the current furnished by emitters **328*a* and 334*a*** (Fig. 2*h*) or homologous emitters. Under these conditions only the core corresponding to the code element 2 will be turned active, whereas the cores previously in this state were those corresponding to the elements of code 1 and 4 (recorded digit 5).

At the end of time B, lines 86 and 98 (Fig. 2*g*) provide a positive pulse, which is applied to triggers 1R, 2R, . . . (Fig. 2*i*) as well as to triggers 1W, 2W, . . . All these triggers are restored to their initial state and are available for a new operation cycle.

*Sign record*.—It has been seen that trigger AR was switched in case the digit read at time B had a sign. Then line 99 is at a positive voltage. It reaches AND circuit 221 (Fig. 2*g*) which is conditioned if AND circuit 269 is conditioned on both its inputs, that is when B9 is switched and B11 off. In such cases, a positive voltage is delivered to line 278 and 95 which reaches adder 360 (Fig. 2*i*). Line 361 which is also referenced A may be driven to a positive or negative voltage according whether a sign is to be recorded or not.

*Switching period of trigger B10 (Fig. 2g).*—This time corresponds to the exhaustion of the factor recorded in zone or field A. In that case, it is necessary to stop one of the scanning chains, as seen previously, and to prevent readout of the memory. A substitution of 0 or 9 is to be performed. Trigger B10 being switched, line 275 is at a negative voltage, and as well as line 258, line 264 (Fig. 2*f*), lines 188, 189, 198, thereby blocking AND circuit 219 (Fig. 2*j*). Line 90 is at a negative voltage, thus blocking AND circuits 327 and 333 (Fig. 2*h*) and preventing any memory read-out during time A. Line 90 is also negative (Fig. 2*j*) causing lines 97 and 88 to be at a negative voltage and blocking AND circuits 327*a*, 333*a* (Fig. 2*h*) and 355 (Fig. 2*i*). The re-writing device is thus blocked.

During time A while a pulse in on 101, line 290 (Fig. 2*j*) is at a positive voltage. Line 295 (Fig. 2*g*) will also be at a positive voltage, because of the switching of trigger B10. Both these voltages are applied to coincidence circuit 288 causing a positive voltage through line 94. The latter controls the substitution of 0 or 9. Two cases are to be considered according to whether trigger B12 is switched or not (Fig. 2*f*).

(*a*) *Trigger B12 is OFF.*—The operation corresponds to an addition as will be seen and 0's are to be substituted. Line 93 is at a positive voltage.

A zero is recorded in the form of code combination 2–8. A connection from line 94 (Fig. 2*i*) reaches OR circuit 363 and thus trigger 8R. Lines 93 and 94 go to AND circuit 364, to OR circuit 365 and to trigger 2R. Positive voltages are thus applied to triggers 8R and 2R causing the switching of these triggers and to record a 0.

(*b*) *Trigger B12 is switched.* — Line 96 (Fig. 2*f*) is now at a positive voltage. A connection from that line reaches adder 360 (Fig. 2*i*) to control it for a subtraction as will be seen later. Another connection from line 96 reaches AND circuit 366, OR circuit 367 and trigger 1R. The circuit reaching trigger 8R is still positive, thus positive voltages are applied to triggers 1R and 8R which corresponds to the recording of a 9.

The following operations are effected as described above.

*Subtracting operation.*—In the case of the operation $b-a=b'$, $b$ is assumed higher than $a$. Under those conditions, $b'$ has the sign of B. Should it be otherwise, $b'$ could be in complement form and a correcting cycle would be necessary to restore the true value of $b'$ and correct the sign. As has been seen, a characteristic sign is provided for defining the sign of $a$ and $b$, the normal position of this sign being the lowest order location.

Let us consider now the algebraic operation in a general way:

$$b+a=b'$$

the magnitude of $b$ being first considered greater than that of $a$. Various cases may be met according to the sign of $a$, the sign of $b$ and the sign of the operation. Depending upon the sign of $a$, $a$ is to be added to or subtracted from $b$ that is the magnitude of $a$ is to be added or subtracted. In such a case, it has been seen that a first switching pulse was applied to trigger B12 (Fig. 2*f*) either during the switching of trigger B5 or during the switching of trigger B7.

The sign of $a$ must be inverted if the operation is subtraction. In this case, a second switching pulse is applied to trigger B12 via AND circuit 233. Said trigger may be, either in its initial state corresponding to 0 or to two minus signs, or in the switched state corresponding to one minus sign.

Finally, the sign of the operation reported to factor $b$ must be inverted once more according to the sign of $b$. To the third case, there corresponds a third switching pulse, which is provided by AND circuit 223.

Two cases are possible as follows: 1—0 or two minus signs, that is 0 or two switching pulses of trigger B12 (magnitudes of $a$ and $b$ are to be added). 2—3 or 3 minus signs, that is one or three switching pulses of trigger B12 (it is necessary to subtract the magnitudes of $a$ and $b$).

If as was assumed, the magnitude of $b$ is greater than the magnitude of $a$, the effected operation will then be in the latter case, $b-a$, subtraction of the magnitude of $a$ being realized by adding its 10's complement, as will now be explained.

Assume trigger B12 switched, line 96 is at a positive voltage, and, as was seen above, a connection from line 96 reaching adder 360 (Fig. 2*i*). The positive voltage on line 96 controls a number of circuits of a well known type which have not been described and the function of which is to change the quantity registered in triggers 1W, 2W, 4W, 8W into the 9's complement form of that quantity. Under these conditions, if we have the operation:

$$285-38=247$$

the actual operation effected will be:

$$\begin{array}{c} 000285 \\ \underline{999961} \\ 000247 \end{array} + C$$

*CCCCC*

The 10's complement operation of the unit digit (or generally speaking of the lowest order digit) is realized by systematically sending a carry pulse through line 92 at the beginning of the operation. It has already been explained that a positive voltage was applied to trigger B12 (Fig. 2*g*) via AND circuit 255 when trigger B9 was switched. The resulting effect of that positive pulse is to switch trigger B13 at the beginning of the operation and to systematically cause a carry pulse to be sent.

During the operation, trigger B13 is switched or reset in turn according to the voltage of leads 84 and 85 (see also Fig. 2*i*) and according to whether a carry is effected from one order to the immediate higher order. Letters C disposed below the result of the preceding operation indicate that there was a carry effected. Particularly it will be remarked that a carry is controlled at the end of the operation so that trigger B13 is switched again at that time. It was explained above that the switching of trigger B3 would follow in response to a pulse from AND circuit 306.

Let us examine now the case where:

$$b=38$$

$$a=285$$

the effected operation is then:

$$\begin{array}{c} 000038 \\ \underline{999714} \\ 999753 \end{array} + C$$

*CC*

At the end of the operation, trigger B13 is returned to its initial state, thereby indicating that the result is in the complement form. It was explained before that the result was the switching of triggers B11 and B6 and the control of a correcting operation cycle, including the successive switching of triggers B7 (Fig. 2*f*), B8 (Fig. 2*g*) and B9. It was seen also that scanning chains A and B are both controlled to sense the memory field storing the operation result, and that trigger B12 (Fig. 2*f*) can receive various switching pulses when triggers B6 and B7 are both switched, but these switching pulses are ineffective because a positive voltage is applied to the right side of trigger B12 through line 241.

Under these conditions, trigger B12 remains switched so that line 96 remains at a positive voltage during the whole correcting operation duration.

When trigger B8 is switched, during time A, the read-out of the first digit of the preceding result, namely 3, is performed. The trigger B9 is switched. The result is the switching of triggers 1R, 2R (Fig. 2*i*) and possibly AR, if initially *b* included a minus sign, and later on the switching of triggers 1W, 2W and possibly AW. However, the read-out of digit 3 is followed by no re-write. For AND circuit 312 (Fig. 2*g*) then is conditioned on both its inputs causing line 313 to turn positive, line 314 to become negative (Fig. 2*j*), coincidence circuit 316 to be blocked, and line 88 to be at a negative voltage. AND circuits 327*a*, 333*a* (Fig. 2*h*) are blocked, thereby preventing operation of the current emitters 328*a*, 334*a*.

During time B, another read-out of the same memory location takes place, which has no result since no quantity has been re-written in said location. However, 0's are automatically entered therein (switching of triggers 8R and 2R, Fig. 2*i*) since line 91 is at a positive voltage. Said line comes from AND circuit 317 (Fig. 2*j*) and it has been explained that it is positive at the beginning of time B.

Trigger B13 (Fig. 2*g*) is also switched (in a similar way to that described above) and adder 360 (Fig. 2*i*) performs the operation:

$$6+0+1=7$$

which results in re-writing digit 7, that is, replacing digit 3 by its 10's complement. It is to be noted that this operation is followed by no carry operation, so that trigger B13 (Fig. 2*g*) returns to its initial state, and that all following operations will be effected without any carry, i.e., they will correspond to but a replacement of all digits by their 9's complement. Thus the considered memory field will finally store quantity 000247 instead of 999753 which it contained previously.

As to the sign, trigger AR (Fig. 2*i*) is restored at the end of the first time A, whereas trigger 1W remains switched so as to keep for a short time the record of that sign. In this case, line 89 is negative, since trigger AW is in its initial state. Line 89 reaches AND circuit 318 (Fig. 2*g*) which is conditioned at this time. Thus, alternately, line 95 is positive or negative, permitting in the first case the recording of a sign if trigger AW (Fig. 2*i*) is OFF, and in the second case causing the deletion of the sign.

*Testing*.—The circuits controlling trigger B15 are so arranged that this trigger is switched if the result is zero, the voltage of hub 368, being then positive. Said hub voltage is brought back to the negative value whenever line 231 is positive, i.e., whenever trigger B6 (Fig. 2*f*) is switched. A zero result corresponds to the following voltages through lines 361 (see also Fig. 2*j*): 1 positive, 2 negative, 4 positive, 8 negative.

The voltages of lines 361–1 and 4 are applied to AND circuit 369 and to inverter 370. Line 371 is negative if the first ones are positive. Likewise, lines 361–2 and 8 reach OR circuit 372. Thus the output lead 373 is negative and goes positive as soon as the voltages of lines 361 correspond to a digit different from zero. At the end of all times B, lines 88 and 122 are positive as was seen above (see also Fig. 1*k*). Under these conditions AND circuit 374 transmits a positive voltage as soon as a digit different from zero appears at the output of adder 360 (Fig. 2*i*). Said voltage applied to trigger B15 (Fig. 2*j*) switches it thereby driving the voltage of hub 368 negative and the voltage of hub 378 positive.

Under the same conditions, trigger B16 stores the sign of factor *b*. Hub 376 is made positive whenever line 231 is positive while trigger B6 is switched (Fig. 2*f*). The sign of factor *b* varies during the switching of trigger B9 (Fig. 2*g*) (line 271 being positive) according to the voltage on line 361–A (Figs. 2*i* and 2*j*). A positive voltage through this last mentioned line means a plus sign. AND circuit 375 then transmits a positive voltage (when lines 88, 122 and 271 are simultaneously positive) which results in switching trigger B16 and in driving hub 377 positive.

*Change of operation program*.—The sequence of the program may be changed, if desired, according to the results of certain computations, that is according to whether the result is zero or not, or whether the result is positive or negative. If it is assumed that the result has been obtained during a certain program operation which is controlled by trigger P1 for example (Fig. 2*e*), the next program step selected may be that controlled by trigger P2 or P3 for example, according to the type of test. For instance the chosen program step may be the program step controlled by trigger P2 if the result is not a zero, and the program step controlled by trigger P3 if zero. In this case, one hub 368 or 378 (Fig. 2*j*) must be linked with hub 379 (Fig. 2*e*) for instance hub 368 (Fig. 2*j*). It was seen that said hub was positive when the result is zero, as will also be hub 379 (Fig. 2*e*). Hub 138 controlled by trigger P1 must then be connected to hub 380. Due to the circuit arrangement (existance of inverter 381 and AND circuits 382 and 382*a*) hubs 383 and 384 are positive or negative according to whether the condition "result different from 0" is realized or not.

In the chosen case, hub 383 is positive if the result is zero, whereas hub 384 is positive if not. Hub 383 will be connected to hub 130*b* for example and hub 384 to tub 130*a*. Under these conditions AND circuits 131*a* and 131*b* are conditioned or not conditioned according to whether the condition "result different from 0" is realized or not, thereafter causing triggers P2 or P3 to be switched, when the switching pulse provided by line 134 appears. As was seen, trigger B6 (Fig. 2*f*) is switched slightly afterwards driving line 231 positive, which resets trigger B15 (Fig. 2*j*) and B16 to their initial states. Such assemblies as those constituted by hubs 379, 380, 383, 384 (Fig. 2*e*) and by associated circuits may be provided in any number.

*Memory split*.—We have already explained the arrangement of the memories, the arrangements and controls of the scanning chains and the program stages. There will now be seen how memories are generally split and how it is possible to proceed at will to any memory split. Let us take for example memory 1, and assume that this memory records factors directly from a punched card by any desired process, for example, by the process described in applicants' copending application Serial No. 704,779 filed Dec. 23, 1957.

Let it be assumed that the card reader is fed from cards of various types suitably filed and comprising for example, "name cards" and "address cards" and "transaction cards", these cards being punched in the following way and recorded as such in register 1, location by location.

(1) "name card"
- Columns 5 to 12 (account number)
- Columns 13 to 40 (name and address)

(2) "transaction card"
- Columns 1 to 4 (transaction date)
- Columns 5 to 12 (account number)
- Columns 13—23 (nature of the transaction)
- Columns 24—27 (date of the transaction)
- Columns 28—30 (code corresponding to the preceding date)
- Columns 31—40 (amount of the transaction).

It is obvious that in every case it is necessary to have access to determine fields of a same memory and this access is connected with the quantities recorded in the memory. For example, it would be nonsense to address locations 24 to 27 normally corresponding to the date of the transaction for a record for the "name card", since said quantity corresponds by no means to a date.

Figure 4:
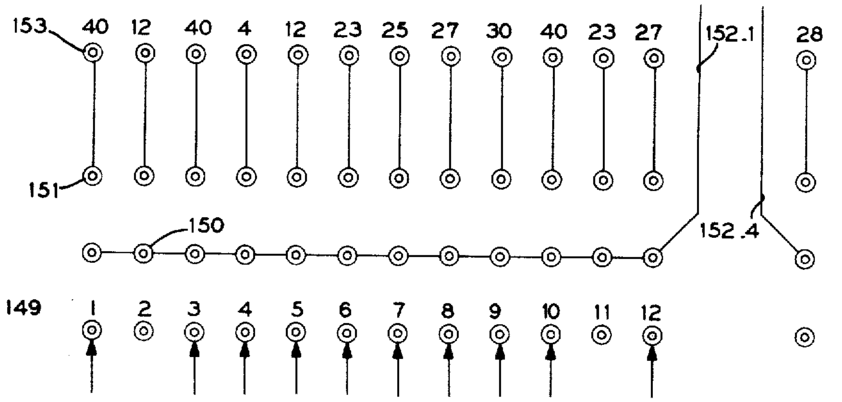
Fig. 4 is an example of some of the control panel hubs used in the present machine.

An example of access connections has been represented in Fig. 4. It is to be kept in mind that said connections are generally realized by linking up some of the hubs 139 or 140 (Fig. 2*e*) with some hubs 149 and by likewise linking some hubs 150 and 151 with some hubs 152 (Fig. 2*a*) or 153 respectively. On the left side of Fig. 4 some of the preceding reference numbers have been numbered 1, 2, 3, 4, . . . hubs 150 and 151 associated with the first ones have been represented straight above. The represented hubs 153 correspond to no logical order, but are primarily related to the nature of the connections. Reference numbers have been quoted for all cases. For example reference number 40 appears three times, which means that the corresponding hub 153 receives three connections. Hubs 139 and 140 (Fig. 2*e*) or similar hubs corresponding to any one of the program steps may be connected in the following way (Fig. 4):

with hub 149–10 to permit access to the field storing the amount of the operation,
with hub 149–9 to permit access to the date code,
with hub 149–8 to permit access to the field storing the month of the transaction date,
with hub 149–7 to permit access to the field storing the days of the month of same date,
with hub 149–6 for the nature of the transaction,
with hub 149–5 for the account number,
with hub 149–3 for permitting access to the name or address.

No connection is provided at the input of hub 149–2, the output connection with hub 153–12 is a scanning end connection. This last connection may be suppressed when a data is to be transferred to another memory in a field having the same magnitude. According to the adopted coding conventions, as seen above, that the stopping of scanning chain B causes the stopping of scanning chain A whether there is a connection for limiting the scanning field or not.

The same connection with hub 149–3 would have been replaced by a connection with hub 149–6, associated with a selector which changes the connection to hub 153 from hub 23 to hub 40. In such a case, the scanning start is done from location 40. The end of the scanning is determined by the first left connection, that is by the connection leading to hub 153–12.

Lastly, a connection leading to hub 149–1 is provided to transfer altogether the first forty memory locations whatever may be the quantity stored therein. Of course, the various controls may be associated with the type of cards whose controls may be affected in well known ways by means of selectors.

Hubs 150 are interconnected and connected to hub 152–1 (Fig. 2*a*).

According to the above, it is possible to determine the connections necessary for access to any field or any memory and to increase or decrease the size of said field at will.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing machine a multiple step program device for controlling the sequence of operation thereof, means interconnecting said steps whereby one only may be activated at any one time, means for advancing said program device from an active step to a selected one of the other steps, a multiple stage ring wherein only one stage may be activated at any one time and adapted to advance from an activated stage through succeeding stages in a timed sequence, means for selectively connecting each program step to the stage of said ring from which it is desired to advance said ring upon the activation of the program step connected thereto, and means responsive to said connecting means for activating the stage of said ring connected to an activated program step.

2. In a data processing machine a multiple step program device for controlling the sequence of operation thereof, means interconnecting said steps whereby one only may be activated at any one time, means for advancing said program device from an active step to a selected one of the other steps, a multiple stage ring wherein only one stage may be activated at any one time and adapted to advance from an activated stage through succeeding stages in a timed sequence, means for selectively connecting each program step to the stage of said ring from which it is desired to advance said ring upon the activation of the program step connected thereto, means responsive to said connecting means for activating the stage of said ring connected to an activated program step, and means responsive to said connecting means for stopping the advance of said ring upon reaching a stage connected to another program step whereby a single connection is effected to start the advance of said ring under control of one program step and to stop the advance of said ring under control of another program step.

3. In a data processing machine a multiple step program device for controlling the sequence of operation thereof, means interconnecting said step whereby one only may be activated at any one time, a multiple stage ring wherein only one stage may be activated at any one time and adapted to advance from an activated stage through successive stages in a timed sequence, means for selectively connecting each program step to the stage of said ring from which it is desired to advance said ring upon the activation of the program step connected thereto, means responsive to said connecting means for activating the stage of said ring connected to an activated program step, means responsive to said connecting means for producing a signal upon reaching a stage connected to another program step, means responsive to said signal for terminating the advance of said ring, and means responsive to said signal for advancing said program device from the then active step to a selected one of the other steps.

4. In a data processing machine a multiple step program device for controlling the sequence of operation thereof, means interconnecting said steps whereby one only may be activated at any one time, a multiple stage ring wherein only one stage may be activated at any one time and adapted to advance from an activated stage through successive stages in a timed sequence, means for selectively connecting each program step to the stage of said ring from which it is desired to advance said ring upon the activation of the program step connected thereto, means responsive to said connecting means for activating the stage of said ring connected to an activated program step, means responsive to said connecting means for producing a signal upon reaching a stage connected to another program step, means responsive to said signal for terminating the advance of said ring, and means responsive to said signal for reactuating the stage of said ring connected to the then activated program step upon a predetermined condition existing in said machine.

5. In a data processing machine a multiple step program device for controlling the sequence of operation thereof, means interconnecting said steps whereby one only may be activated at any one time, a multiple stage ring wherein only one stage may be activated at any one time and adapted to advance from an activated stage through successive stages in a timed sequence, means for selectively connecting each program step to the stage of said ring from which it is desired to advance said ring upon the activation of the program step connected thereto, means responsive to said connecting means for activating the stage of said ring connected to an activated program step, means responsive to said connecting means for producing a signal upon reaching a stage connected to another program step, means responsive to said signal for terminating the advance of said ring, a selector, means responsive to a result manifested in said machine for controlling said selector, and means responsive to said signal for advancing said program device from the then active step to another one of said steps selected by said selector.

6. Apparatus according to claim 3 wherein said interconnecting means includes means for pluggably connecting the steps of said program device so as to occur in any predetermined sequence.

7. Apparatus according to claim 6 wherein said connecting means comprise means for pluggably connecting the steps of said program device to stages of said ring so that said ring is reset to any predetermined stage upon the activation of any predetermined program step.

8. In a data processing machine a multiple step program device for controlling the sequence of operation thereof, means interconnecting said steps whereby one only may be activated at any one time, a first multiple stage ring wherein only one stage may be activated at any one time and adapted to advance from an activated stage through successive stages in a first timed sequence, first means for selectively connecting each program step to the stage of said first ring from which it is desired to advance said first ring upon the activation of the program step connected thereto, means responsive to said first connecting means for activating the stage of said first ring connected to an activated program step, means responsive to said first connecting means for producing a first signal upon said first ring's reaching a stage connected to another program step, a second multiple stage ring wherein only one stage may be activated at any one time and adapted to advance alternately with the advance of said first ring from an activated stage through successive stages in a second timed sequence interspersed with said first timed sequence, second means for selectively connecting each program step to the stage of said second ring from which it is desired to advance said second ring upon the activation of the program step connected thereto, means responsive to said second connecting means for activating the stage of said second ring connected to an activated program step, means responsive to said second connecting means for producing a second signal upon said second ring's reaching a stage connected to another program step, means responsive to said first signal for terminating the advance of said first ring, means responsive to said second signal for terminating the advance of said second ring, and means responsive to said first signal for advancing said program device from the then active step to a selected one of the other steps.

9. In a data processing machine a multiple step program device for controlling the sequence of operation thereof, means interconnecting said steps whereby one only may be activated at any one time, a first multiple stage ring wherein only one stage may be activated at any one time and adapted to advance from an activated stage through successive stages in a first timed sequence, first means for selectively connecting each program step to the stage of said first ring from which it is desired to advance said first ring upon the activation of the program step connected thereto, means responsive to said first connecting means for activating the stage of said first ring connected to an activated program step, means responsive to said first connecting means for producing a first signal upon said first ring's reaching a stage connected to another program step, a second multiple stage ring wherein only one stage may be activated at any one time and adapted to advance alternately with the advance of said first ring from an activated stage through successive stages in a second timed sequence interspersed with said first timed sequence, second means for selectively connecting each program step to the stage of said second ring from which it is desired to advance said second ring upon the activation of the program step connected thereto, means responsive to said second connecting means for activating the stage of said second ring connected to an activated program step, means responsive to said second connecting means for producing a second signal upon said second ring's reaching a stage connected to another program step, means responsive to said first signal for terminating the advance of said first ring, means responsive to said second signal for terminating the advance of said second ring, means responsive to said first signal for terminating the advance of said second ring upon the occurrence of said first signal before the occurrence of said second signal, and means responsive to said first signal for advancing said program device.

10. In a data processing machine a multiple step program device for controlling the sequence of operation thereof, means interconnecting said steps whereby one only may be activated at any one time, a first multiple stage ring wherein only one stage may be activated at any one time and adapted to advance from an activated stage through successive stages in a first timed sequence, first means for selectively connecting each program step to the stage of said first ring from which it is desired to advance said first ring upon the activation of the program step connected thereto, means responsive to said first connecting means for activating the stage of said first ring connected to an activated program step, means responsive to said first connecting means for producing a first signal upon said first ring's reaching a stage connected to another program step, a second multiple stage ring wherein only one stage may be activated at any one time and adapted to advance alternately with the advance of said first ring from an activated stage through successive stages in a second timed sequence interspersed with said first timed sequence, second means for selectively connecting each program step to the stage of said second ring from which it is desired to advance said second ring upon the activation of the program step connected thereto, means responsive to said second connecting means for activating the stage of said second ring connected to an activated program step, means responsive to said second connecting means for producing a second signal upon said second ring's reaching a stage connected to another program step, means responsive to said first signal for terminating the advance of said first ring, means responsive to said second signal for terminating the advance of said second ring, a storage array having a plurality of addressable positions and adapted to be alternately addressed by said first and said second rings, means for addressing said storage array at positions corresponding to the activated stages of said rings, a delay device, and means for reading data out from positions addressed by said second ring through said delay device and entering said data into positions addressed by said first ring.

11. In a data processing machine a multiple step program device for controlling the sequence of operation thereof, means interconnecting said steps whereby one only may be activated at any one time, a first multiple stage ring wherein only one stage may be activated at any one time and adapted to advance from an activated stage through successive stages in a first timed sequence, first means for selectively connecting each program step to the stage of said first ring from which it is desired to advance said first ring upon the activation of the program step connected thereto, means responsive to said first connecting means for activating the stage of said first ring connected to an activated program step, means responsive to said first connecting means for producing a first signal upon said first ring's reaching a stage connected to another program step, a second multiple stage ring wherein only one stage may be activated at any one time and adapted to advance alternately with the advance of said first ring from an activated stage through successive stages in a second timed sequence interspersed with said first timed sequence, second means for selectively connecting each program step to the stage of said second ring from which it is desired to advance said second ring upon the activation of the program step connected thereto, means responsive to said second connecting means for activating the stage of said second ring connected to an activated program step, means responsive to said second connecting means for producing a second signal upon said second ring's reaching a stage connected to another program step, means responsive to said first signal for terminating the advance of said first ring, means responsive to said second signal for terminating the advance of said second ring, a storage array having a plurality of addressable positions and adapted to be alternately addressed by said first and said second rings, means for addressing said storage array at positions corresponding to the activated stages of said rings, a delay device, a single digit adder having a pair of inputs and an output adapted to manifest the sum of two digits simultaneously applied to said pair of inputs, means for reading data out from positions addressed by said second ring through said delay device to one input of said adder, means for reading data out from positions addressed by said first ring to the other input of said adder, and means for entering the data manifestations appearing at said output back into the positions addressed by said first ring.

12. Apparatus according to claim 11 further characterized by the provision of a complementing circuit and means responsive to a sign detection for routing data from positions of said storage array addressed by said first ring through said complementing circuit.

13. Apparatus according to claim 11 wherein said storage array is comprised of a plurality of magnetic core storage devices.

14. Apparatus according to claim 13 wherein said connecting means comprise means for pluggably connecting said program steps to the stages of said rings.

15. Apparatus according to claim 14 further characterized by the provision of means responsive to said first signal for advancing said program device from the then active step to a selected one of the other steps.

16. Apparatus according to claim 10 further characterized by the provision of means responsive to a complement in said storage array for disabling said second connecting means and setting said second ring in accordance with said first connecting means, a complementing circuit, and means for reading data out from the positions addressed by said rings through said complementing circuit and back into the positions from which they came.

References Cited in the file of this patent

UNITED STATES PATENTS

| | | |
|---|---|---|
| 2,719,965 | Person | Oct. 4, 1955 |
| 2,797,862 | Andrews | July 2, 1957 |